(12) United States Patent
Inada et al.

(10) Patent No.: US 7,683,101 B2
(45) Date of Patent: Mar. 23, 2010

(54) PRE-EXPANDED PARTICLE OF OLEFIN-MODIFIED POLYSTYRENE RESIN, PROCESS FOR PRODUCING THE SAME, AND MOLDED FOAM

(75) Inventors: Naokuni Inada, Shiga (JP); Hideyasu Matsumura, Shiga (JP); Yasutaka Tsutsui, Shiga (JP); Ikuo Morioka, Shiga (JP)

(73) Assignee: Sekisui Plastics Co., Ltd., Osaka (JP)

( * ) Notice: Subject to any disclaimer, the term of this patent is extended or adjusted under 35 U.S.C. 154(b) by 952 days.

(21) Appl. No.: 10/567,084

(22) PCT Filed: Jul. 23, 2004

(86) PCT No.: PCT/JP2004/010490

§ 371 (c)(1),
(2), (4) Date: Feb. 3, 2006

(87) PCT Pub. No.: WO2005/021624

PCT Pub. Date: Mar. 10, 2005

(65) Prior Publication Data

US 2006/0217452 A1    Sep. 28, 2006

(30) Foreign Application Priority Data

Aug. 29, 2003    (JP) ............................. 2003-307870

(51) Int. Cl.
*C08J 9/18* (2006.01)
*C08J 9/232* (2006.01)

(52) U.S. Cl. .......................... 521/56; 521/60; 521/134; 521/139; 521/142; 521/143; 521/146; 525/192; 525/193; 525/194

(58) Field of Classification Search ......... 525/192–194; 521/59, 60, 134, 139, 142, 143, 146
See application file for complete search history.

(56) References Cited

U.S. PATENT DOCUMENTS

| | | | |
|---|---|---|---|
| 3,417,170 A | 12/1968 | Knapp | |
| 3,959,189 A | 5/1976 | Kitamori | |
| 4,080,344 A | 3/1978 | Ikeda et al. | |
| 4,168,353 A | * 9/1979 | Kitamori | 521/59 |
| 4,303,756 A | * 12/1981 | Kajimura et al. | 521/59 |
| 4,303,757 A | * 12/1981 | Kajimura et al. | 521/59 |
| 4,647,593 A | 3/1987 | Bartosiak et al. | |
| 4,677,134 A | 6/1987 | Fudge | |
| 4,769,393 A | 9/1988 | Kuwabara et al. | |
| 5,229,429 A | 7/1993 | Hahn et al. | |
| 5,496,864 A | 3/1996 | Henn et al. | |
| 2002/0072547 A1 | 6/2002 | Barron et al. | |
| 2003/0105174 A1 | 6/2003 | Braun | |

FOREIGN PATENT DOCUMENTS

| | | |
|---|---|---|
| DE | 2636199 | 6/1975 |
| DE | 2663199 | 6/1975 |
| DE | 3835638 | 4/1990 |
| EP | 0256489 | 2/1988 |
| EP | 0263989 | 4/1988 |
| GB | 2110217 | 6/1983 |
| JP | 49-5473 | 1/1974 |
| JP | 49-85187 | 8/1974 |
| JP | 51-37980 | 3/1976 |
| JP | 52-076372 | 6/1977 |
| JP | 54-119563 | 9/1979 |
| JP | 59-3487 | 1/1984 |
| JP | 1-284536 | 11/1989 |
| JP | 6-122781 | 5/1994 |
| JP | 8-19168 | 2/1996 |
| JP | 2760361 | 3/1998 |
| JP | 10-265511 | 10/1998 |
| JP | 2915134 | 4/1999 |
| JP | 2000-204105 | 7/2000 |
| WO | 0187858 | 11/2001 |

OTHER PUBLICATIONS

English language Abstract of JP 1-284536.
English language Abstract of JP 6-122781.
English language Abstract of WO 0187858.
English language Abstract of JP 10-265511.
English language Abstract of JP 2000-204105.

* cited by examiner

*Primary Examiner*—Irina S Zemel
(74) *Attorney, Agent, or Firm*—Greenblum & Bernstein, P.L.C.

(57) ABSTRACT

A pre-expanded beads of olefin-modified polystyrene-based resin comprising a pie-expanded beads of a polystyrene-based resin modified with a polyolefin-based resin, wherein a styrene-based monomer forming a polystyrene-based resin in the beads is used in the range of 100 to 1,000 parts by weight relative to 100 parts by weight of a polyolefin-based resin, a bulk density of each bead is 0.012 to 0.20 g/cm$^3$, and an absorbance ratio at 698 cm$^{-1}$ and 2850 cm$^{-1}$ ($D_{698}/D_{2850}$) obtained from an infrared absorption spectrum of each bead surface measured by ATR method infrared spectroscopy is in the range of 0.1 to 2.5.

18 Claims, 6 Drawing Sheets

EMBEDDED RESIN

US 7,683,101 B2

PRE-EXPANDED PARTICLE OF OLEFIN-MODIFIED POLYSTYRENE RESIN, PROCESS FOR PRODUCING THE SAME, AND MOLDED FOAM

TECHNICAL FIELD

The present invention relates to pre-expanded beads of olefin-modified polystyrene-based resin, a production method therefore and an expanded molded article. According to the pre-expanded beads of olefin-modified polystyrene-based resin of the present invention, an expanded molded article having excellent stiffness, chemical resistance and impact resistance can be obtained.

BACKGROUND ART

Previously, it has been known that a polystyrene-based resin expanded molded article, obtained by filling polystyrene-based resin pre-expanded beads in a mold, and heating and expanding, is excellent in stiffness, thermal insulating property, lightweight property, water resistance and expansion moldability. For this reason, this expanded molded article is widely used as a cushioning material or a thermal insulating material for a building material. However, this expanded molded article has a problem that it is inferior in chemical resistance and impact resistance.

On the other hand, it is known that an expanded molded article comprising a polyolefin-based resin such as a polyethylene-based resin and a polypropylene-based resin is excellent in chemical resistance and impact resistance. For this reason, this expanded molded article is used in automobile-related parts. However, since the polyolefin-based resin is inferior in retainability of a blowing gas, and it is necessary to precisely control expansion molding conditions, there is a problem that the manufacturing cost is high. In addition, there is also a problem that stiffness is inferior as compared with the polystyrene-based resin expanded molded article.

In order to overcome the problems of the polystyrene-based resin and the polyolefin-based resin, there is reported an expanded molded article obtained by combining the polystyrene-based resin having better stiffness and expansion moldability, and the polyolefin-based resin having better chemical resistance and impact resistance.

Nature of this combined expanded molded article is greatly influenced by a ratio of the polystyrene-based resin and the polyolefin-based resin. That is, as a ratio of the polyolefin-based resin is higher, chemical resistance and impact resistance of an expanded molded article are improved, but stiffness and expansion moldability are lowered.

In particular, when the expanded molded article is used in automobile-related parts, since there is a possibility that the article is contacted with chemicals such as gasoline, kerosene, brake oil and vinyl chloride plasticizer, and undergoes strong impact, high chemical resistance and impact resistance are required. As a method satisfying this requirement, there is known a method of improving chemical resistance and impact resistance of the expanded molded article by adjusting a polyolefin-based resin component in an expanded molded article at 50% by weight or more. However, in this method, since an amount of the polystyrene-based resin component is relatively reduced, stiffness and expansion moldability of the expanded molded article are greatly lowered. As a result, this expanded molded article could not be widely used in automobile-related parts.

Then, for the purpose of mutually compensating drawbacks of the polystyrene-based resin and the polyolefin-based resin to satisfy properties of both of them, there is proposed a secondary-expandable expanded resin beads comprising a surface layer composed of an expanding polyolefin-based resin and a core part composed of an expanding polystyrene-based resin (Japanese Unexamined Patent Publication No. SHO 54(1979)-119563).

It is described that, according this expanded resin bead, since the blowing agent is retained in the expanding polystyrene-based resin in the core part, moldability is excellent. Further, it is described that an expanded molded article obtained from this expanded resin bead is excellent in stiffness, flexibility and low temperature properties.

However, the present inventors reproduced an experiment of the Publication and, when the blowing agent was impregnated into resin beads in which polystyrene-based resin beads were covered with a polyolefin-based resin, and this was pre-expanded, only the polystyrene-based resin in the interior was greatly expanded, while the polyolefin-based resin was slightly expanded, or was not expanded at all. As a result, a layer of the polyolefin-based resin and a layer of the polystyrene-based resin were peeled, and the expanded molded article of interest could not be obtained.

In addition to the aforementioned method, there is proposed a method of obtaining expanded resin beads in which the polystyrene-based resin was modified with the polyolefin-based resin, by impregnating polyethylene-based resin beads with a styrene-based monomer, and polymerizing this in an aqueous medium (e.g. Japanese Examined Patent Publication No. SHO59 (1984)-3487).

However, even by the aforementioned method, polystyrene-based resin pre-expanded beads which can provide an expanded molded article realizing simultaneously high chemical resistance, impact resistance, stiffness and expansion moldability could not be obtained.

DISCLOSURE OF THE INVENTION

Thus, according to the present invention, there is provided an pre-expanded beads of olefin-modified polystyrene-based resin comprising a pre-expanded beads of a polystyrene-based resin modified with a polyolefin-based resin, wherein a styrene-based monomer forming a polystyrene-based resin in the beads is used in the range of 100 to 1,000 parts by weight relative to 100 parts by weight of a polyolefin-based resin, a bulk density of each bead is 0.012 to 0.20 g/cm$^3$, and an absorbance ratio at 698 cm$^{-1}$ and 2850 cm$^{-1}$ ($D_{698}/D_{2850}$) obtained from an infrared absorption spectrum of each bead surface measured by ATR method infrared spectroscopy is in the range of 0.1 to 2.5.

Further, according to the present invention, there is provided a method for producing pre-expanded beads of olefin-modified polystyrene-based resin comprising the steps of:

(a) polymerizing a styrene-based monomer (100 to 1,000 parts by weight relative to 100 parts by weight of polyolefin-based resin beads to be used) while impregnating polyolefin-based resin beads with the styrene-based monomer, in the presence of a polymerization initiator in an aqueous medium in which the polyolefin-based resin beads are dispersed, to obtain the olefin-modified polystyrene-based resin beads, (b) impregnating the resin beads with a blowing agent, and (c) pre-expanding the resin beads impregnated the blowing agent to obtain the pre-expanded beads of olefin-modified polystyrene-based resin, wherein in the step (a), the aqueous medium is stirred at a power required for stirring of 0.06 to 0.8 kw/m$^3$, and impregnation and polymerization of the styrene-based monomer are performed under a condition where a styrene-based monomer content in the polyolefin-based resin beads is 35% by weight or less.

BEST MODE FOR CARRYING OUT THE INVENTION

First, a term "olefin-modified polyolefin-based resin" means a resin in which a polystyrene-based resin is modified with a polyolefin-based resin. Hereinafter, pre-expanded beads of olefin-modified polystyrene-based resin are simply referred to as the pre-expanded beads.

The polyolefin-based resin is not particularly limited, but resins obtained by the known polymerizing method can be used. In addition, as the polyolefin-based resin, a resin not containing a benzene ring in a structure is preferably used. Further, the polyolefin-based resin may be crosslinked. Examples thereof include polyethylene-based resins such as branched low-density polyethylene, linear low-density polyethylene, medium-density polyethylene, high-density polyethylene, ethylene-vinyl acetate copolymer, ethylene-methyl methacrylate copolymer, and crosslinked polymer of these polymers, and polypropylene-based resins such as propylene homopolymer, ethylene-propylene random copolymer, propylene-1-butene copolymer, and ethylene-propylene-butene random copolymer. Among them, branched low-density polyethylene, linear low-density polyethylene, and ethylene-vinyl acetate copolymer are preferable. Preferably, these low-density polyethylenes have a density of preferably 0.91 to 0.94 g/cm$^3$, more preferably 0.91 to 0.93 g/cm$^3$.

Examples of the polystyrene-based resin include resins derived from styrene-based monomer such as styrene, α-methylstyrene, p-methylstyrene, and t-butylstyrene. Further, the polystyrene-based resin may be a copolymer of a styrene-based monomer, and other monomer copolymerizable with a styrene-based monomer. Examples of other monomer include a polyfunctional monomer such as divinylbenzene, and (meth)acrylic acid alkylester not containing a benzene ring in a structure such as butyl (meth)acrylate. These other monomers may be used in the range substantially not exceeding 5% by weight relative to the polystyrene-based resin.

A "z" average molecular weight of the polystyrene-based resin measured with GPC is preferably to be 350,000 to 1,100,000, more preferably to be 450,000 to 950,000. When the "z" average molecular weight is lower than 350,000, it is not preferable because a strength of an expanded molded article obtained by expansion-molding the pre-expanded beads is lowered in some cases. On the other hand, the "z" average molecular weight is higher than 1,100,000, it causes undesirable result that secondary expandability of the pre-expanded beads is lowered, fusibility between mutual pre-expanded beads is lowered, and a strength of the expanded molded article is lowered in some cases.

The polystyrene-based resin is formed from a styrene-based monomer in the range of 100 to 1,000 parts by weight relative to 100 parts by weight of the polyolefin-based resin. A preferable mixing amount of the styrene-based monomer is 120 to 800 parts by weight, more preferably 130 to 700 parts by weight.

When the mixing amount is more than 1,000 parts by weight, it is not preferable because chemical resistance and impact resistance of the expanded molded article obtained by secondarily expanding the pre-expanded beads are lowered. On the other hand, when the mixing amount is less than 100 parts by weight, it is not preferable because stiffness of the expanded molded article obtained by secondarily expanding the pre-expanded beads is lowered.

The pre-expanded bead has a bulk density of 0.012 to 0.20 g/cm$^3$. A preferable bulk density is 0.014 to 0.15 g/cm$^3$.

When the bulk density is less than 0.012 g/cm$^3$, it is not preferable because a closed cell fraction of an expanded bead is lowered, and a strength of the expanded molded article obtained by expanding the pre-expanded beads is lowered. On the other hand, when the bulk density is more than 0.20 g/cm$^3$, it is not preferable because a weight of the expanded molded article obtained by expanding the pre-expanded beads is increased. A method of measuring the bulk density will be explained in the part of Examples.

Further, the pre-expanded bead of the present invention has absorbance ratios at 698 cm$^{-1}$ and 2850 cm$^{-1}$ ($D_{698}/D_{2850}$) in the range of 0.1 to 2.5, from an infrared absorption spectrum obtained by measuring a surface thereof by ATR method infrared spectroscopy. A preferable absorbance ratio is 0.2 to 2.0, more preferably 0.4 to 2.0. The surface of a bead includes a region from the surface to a depth of a few micrometers.

When the absorbance ratio is higher than 2.5, a ratio of the polyolefin-based resin in the surface of the pre-expanded bead is reduced. It causes undesirable result that chemical resistance and impact resistance of the expanded molded article obtained by expansion-molding pre-expanded beads are lowered. When the absorbance ratio is lower than 0.1, it is not preferable because there is a tendency that dissipation of a blowing agent from a surface of the pre-expanded bead becomes remarkable, whereby, fusion between beads in molding in a mold becomes worse, and impact resistance is conversely lowered, and finished state of appearance of the expanded molded article is deteriorated due to shrinkage and others. In addition, upon preparation of the pre-expanded beads, a time necessary for impregnation of the styrene-based monomer into the polyolefin-based resin beads and for polymerization becomes longer, and preparation efficacy is undesirably lowered.

Herein, ATR method infrared spectroscopy in the present invention is an analysis method of measuring infrared absorption spectrum by one time reflection-type ATR method utilizing attenuated total reflectance. This analysis method is a method of adhering an ATR prism having a high reflective index to a sample, irradiating the sample with infrared-ray through an ATR prism, and spectroscopically analyzing the emitted light from an ATR prism.

The ATR method infrared spectroscopy is widely utilized in analyzing surfaces of various substances including organics such as polymer materials, for the reasons of simpleness that spectrum can be measured simply by adhering a sample and an ATR prism, and a surface to a depth of a few micrometers can be analyzed, etc.

Absorbance $D_{698}$ at 698 cm$^{-1}$ obtained from an infrared absorption spectrum refers to a height of a peak appearing around 698 cm$^{-1}$ which is derived from out-of-plane deformation vibration of a benzene ring mainly contained in the polystyrene-based resin.

In addition, absorbance $D_{2850}$ at 2850 cm$^{-1}$ obtained from an infrared absorption spectrum refers to a height of a peak appearing around 2850 cm$^{-1}$ derived from stretching vibration between C—H of a methylene group contained in both of the polyolefin-based resin and the polystyrene-based resin.

Composition ratios of the polystyrene-based resin and the polyolefin-based resin can be obtained from an absorbance ratio. That is, plural kinds of standard samples in which the polystyrene-based resin and the polyolefin-based resin are uniformly mixed at a predetermined composition ratio are prepared as outlined below. Each standard sample is subjected to bead surface analysis by ATR method infrared spectroscopy to obtain an infrared absorption spectrum. The absorbance ratio is calculated from each of measured infrared absorption spectra.

Then, by taking a composition ratio (weight ratio of polystyrene-based resin in standard sample) as an abscissa axis and an absorbance ratio as an ordinate axis, a calibration curve is drown. Based on this calibration curve, from the absorbance ratio of the pre-expanded bead of the present invention, an approximate composition ratio of the polystyrene-based resin and the polyolefin-based resin can be obtained.

For example, in the case where a polyolefin-based resin is an ethylene-vinyl acetate copolymer (trade name "LV-121" manufactured by Japan Polychem Corp.) and a polystyrene-based resin is polystyrene (trade name "MS142" manufactured by Sekisui Plastics Co., Ltd.), an approximate composition ratio thereof can be known by using a calibration curve shown in FIG. 9. For example, when the absorbance ratio is 1.0, it can be calculated that the polyolefin-based resin is about 76 to 82% by weight and the polystyrene-based resin is about 24 to 18% by weight. When the absorbance ratio is 2.5, it can be calculated that the polyolefin-based resin is about 51 to 57% by weight and the polystyrene-based resin is about 49 to 43% by weight. Conditions for making the calibration curve are according to the following method.

The aforementioned standard sample can be obtained by the following method: First, a total 2 g of a polystyrene-based resin and a polyolefin-based resin are precisely weighed so that a composition ratio (polystyrene-based resin/polyolefin-based resin) becomes the following ratio. This mixture is heated and kneaded with a small size injection molding machine under the following conditions, and is molded into a cylindrical shape having a diameter of 25 mm and a height of 2 mm, thereby, a standard sample is obtained. As the small size injection molding machine, for example, machine sold by CSI Company under trade name of "CS-183" can be used.

Injection molding conditions: heating temperature of 200 to 250° C., kneading time of 10 minutes Composition ratio (polystyrene-based resin/polyolefin-based resin; weight ratio): 0.5/9.5, 1/9, 2/8, 3/7, 4/6, 5/5, 6/4, 7/3, 9/1

A calibration curve of FIG. 9 is obtained by measuring absorbance ratios of a standard samples having the aforementioned rates and graphing a relationship between a polystyrene amount and the absorbance ratio.

The pre-expanded bead of the present invention has an absorbance ratio of 0.1 to 2.5. Therefore, depending on a kind of the polyolefin-based resin and the polystyrene-based resin, a ratio of the polyolefin-based resin near a surface of the pre-expanded bead is about 50% by weight or more. As a whole of pre-expanded beads, determining from that a mixing amount of the polyolefin-based resin is less than a mixing amount of a polystyrene-based resin, it is seen that the polyolefin-based resin is richer than the polystyrene-based resin on a surface of the pre-expanded bead. % by weight of the polyolefin-based resin relates to a total amount of the polyolefin-based resin and the polystyrene-based resin in whole pre-expanded beads is 9 to 50% by weight. In addition, since the absorbance ratio is 0.1 or more, a polystyrene resin is present on a surface of the pre-expanded bead, and the polyolefin-based resin does not become 100% by weight.

A pre-expanded bead in which a mixing amount of a polystyrene-based resin is large as a whole, and a mixing amount of a polyolefin-based resin is large on a surface as described above has an especial structure which can not be obtained by the conventional method.

A shape of the pre-expanded bead is not particularly limited as far as it does not influence on secondary expansion thereafter. Examples of the shape include spherical shape, elliptic spherical shape (egg-shape), a cylindrical shape and a rectangular shape. Among them, spherical shape, elliptic spherical shape, which are easy in charging into a mold, are preferable.

An average weight of each pre-expanded bead is preferably 0.5 to 5.0 mg, more preferably 0.5 to 3.0 mg. When the average weight is smaller than 0.5 mg, it is not preferable because high expansion becomes difficult in some cases. On the other hand, when the average weight is larger than 5.0 mg, it may cause undesirable result that the pre-expanded bead becomes too large, charging property into the mold is lowered, and appearance of the resulting expanded molded article is deteriorated in some cases. A weight of each pre-expanded bead refers to the average weight of arbitrarily selected 200 pre-expanded beads.

The pre-expanded bead may contain additives. Examples of the additives include a cell-nucleating agent such as talc, calcium silicate, ethylenebisstearic acid amide and methacrylic acid ester copolymer, a filler such as synthetic or naturally occurring silicon dioxide, a flame-retardant such as hexabromocyclododecane and triallyl isocyanurate hexabromide, a plasticizer such as diisobutyl adipate, liquid paraffin, diacetylated glycerin monolaurate and coconut oil, a colorant such as carbon black and graphite, an ultraviolet absorber, and an antioxidant.

Then, a method for producing the pre-expanded beads of the present invention will be explained.

First, the styrene-based monomer (100 to 1,000 parts by weight relative to 100 parts of polyolefin-based resin bead to be used) is polymerized while it is impregnated into polyolefin-based resin beads, in the presence of a polymerization initiator in an aqueous medium in which the polyolefin-based resin beads are dispersed, to obtain an olefin-modified polystyrene-based resin beads (hereinafter, also referred to as modified resin beads) (step (a)).

The styrene-based monomer may be continuously or intermittently added to the aqueous medium in order to impregnate into the polyolefin-based resin beads. It is preferable that the styrene-based monomer is gradually added to the aqueous medium.

Examples of the aqueous medium include water, and a mixed medium of water and water-soluble solvent (e.g. alcohol).

Further, in view of easy charging of the produced pre-expanded beads into the mold at molding, an average weight of each polyolefin-based resin bead is preferably 0.10 to 1.5 mg. The average weight of the polyolefin-based resin beads refers to the average weight of arbitrarily selected 100 polyolefin-based resin beads. A shape of the polyolefin-based resin bead is not particularly limited. Examples of the shape include a spherical shape, elliptic spherical shape (egg-shape), a cylindrical shape and a rectangular shape.

When a mixing amount of the styrene-based monomer is more than 1,000 parts by weight, it is not preferable because a bead of a polystyrene-based resin alone is generated without impregnation into a polyolefin-based resin bead. In addition, it causes undesirable result that chemical resistance and impact resistance of the expanded molded article obtained by secondarily expanding the pre-expanded beads are lowered. On the other hand, when a mixing amount of the styrene-based monomer is less than 100 parts by weight, a time necessary for impregnation into a polyolefin-based resin bead and for polymerization is shortened, but it is not preferable because ability of the resulting olefin-modified polystyrene-based resin bead to retain a blowing agent is lowered and high expansion can not be obtained. In addition, it is riot preferable because stiffness of the expanded molded article obtained by secondarily expanding the pre-expanded beads is lowered.

It is preferable that a dispersant is added to the aforementioned aqueous medium. Example of such the dispersant include organic dispersants such as partially saponified polyvinyl alcohol, polyacrylate, polyvinylpyrrolidone, carboxymethylcellulose, and methylcellulose, and inorganic dispersants such as magnesium pyrophosphate, calcium pyrophosphate, calcium phosphate, calcium carbonate, magnesium phosphate, magnesium carbonate, and magnesium oxide. Among them, inorganic dispersants are preferable.

When the inorganic dispersant is used, it is preferable to use a surfactant in combination. Examples of such the surfactant include sodium dodecylbenzenesulfonate, and sodium α-olefinsulfonate.

Herein, steps of impregnating and polymerizing a styrene-based monomer may be performed separately as far as impregnation is first performed, but simultaneous progression is preferable.

In the case of simultaneous progression, it is preferable that impregnation and polymerization are performed by adjusting a rate of adding the styrene-based monomer so that a content of the styrene-based monomer in a polyolefin-based resin bead is maintained at 0 to 35% by weight, adjusting a polymerization temperature, or the like. When a step of addition, a step of impregnation and a step of polymerization are continuously performed, the content is preferably 0.5 to 35% by weight, more preferably 0.5 to 30% by weight.

In addition, the polyolefin-based resin bead in the case of calculation of the aforementioned content means a bead composed of the polyolefin-based resin and an impregnated styrene-based monomer and, further, impregnated and already polymerized polystyrene-based resin.

When a content of the styrene-based monomer is more than 35% by weight, even if a power required for stirring (Pv) is adjusted in the range described later, it causes undesirable result that the pre-expanded bead having an absorbance ratio in a predetermined range is not obtained in some cases.

In the present invention, the aqueous medium containing the polyolefin-based resin beads and the styrene-based monomer is stirred under the prescribed condition. Specifically, this is stirring condition which is adjusted so that a power required for stirring (Pv) necessary for stirring 1 m$^3$ of the aqueous medium containing the polyolefin-based resin beads, the styrene-based monomer and, if necessary, other dispersion and solution becomes 0.06 to 0.8 kw/m$^3$. It is preferable that a power required for stirring is 0.08 to 0.7 kw/m$^3$. This power required for stirring corresponds to energy per net unit volume which the contents in a reaction vessel have undergone by stirring.

Conventionally, when the styrene-based monomer is polymerized while impregnated into the polyolefin-based resin beads, in the aqueous medium, stirring of the aqueous medium was not given an attention, and polymerization was performed at condition under which the aqueous medium can be sufficiently stirred. It is presumed that the conventional power required for stirring is around 1 to 2 kw/m$^3$. To the contrary, the production method of the present invention is performed by unexpectedly finding that, by reducing the power required for stirring than the conventional power, the polyolefin-based resin is localized near a surface of the modified resin bead accompanied with polymerization of the styrene-based monomer, the modified resin bead rich in the polyolefin-based resin is obtained near a surface.

By adjusting the power required for stirring in a predetermined range and, at the same time, adjusting a content of the styrene-based monomer in the polyolefin-based resin bead at a predetermined amount, it becomes possible to sufficiently impregnate the styrene-based monomer to around a central part of the polyolefin-based resin bead. As a result, the state can be obtained in which the styrene-based monomer is present at a large amount at a central part of the polyolefin-based resin bead, and an amount of the styrene-based monomer is gradually reduced from a central part of the polyolefin-based resin bead towards a surface thereof.

Further, since polymerization is performed while the styrene-based monomer is sequentially absorbed in the polystyrene-based resin produced in the polyolefin-based resin bead, the polyolefin-based resin bead is grown to a larger diameter accompanied with production of the polystyrene-based resin, while the state is realized in which the polystyrene-based resin is rich at a part nearer a central part.

As a result, the pre-expanded bead obtained as outlined later contains the polystyrene-based resin at a high ratio in its central part, and the polyolefin-based resin is dispersed in the polystyrene-based resin in a layer manner. On the other hand, a state at a part near a surface is where, the polyolefin-based resin is contained at a high ratio, a ratio and a size of the polystyrene-based resin are gradually reduced towards a bead surface, and a polystyrene-based resin is slightly dispersed in the polyolefin-based resin. At a bead surface, there is little polystyrene-based resin, and the polyolefin-based resin is present at a higher ratio.

When a power required for stirring is less than 0.06 kw/m$^3$, dispersion of the styrene-based monomer in the aqueous medium becomes insufficient, and it is difficult to sufficiently impregnate the styrene-based monomer into a central part of the polyolefin-based resin bead. For this reason, polymerization of the styrene-based monomer at a part near a surface of the polyolefin-based resin bead has progressed, and a composition ratio of the polyolefin-based resin at a part near a surface of a resulting modified resin bead is reduced. As a result, chemical resistance and impact resistance of the expanded molded article obtained by expanding the modified resin bead are lowered.

Conversely, when a power required for stirring is higher than 0.8 kw/m$^3$, mixing of the styrene-based monomer and the polyolefin-based resin in the modified resin bead proceeds, and it becomes difficult to obtain the modified resin bead rich in the polyolefin-based resin at a part near surface. In addition, the polyolefin-based resin bead which has been impregnated with the styrene-based ionomer and softened is deformed into flat-like in some cases. In this case, it becomes difficult to obtain the pre-expanded bead having sufficient secondary expandable property.

Herein, a power required for stirring refers to a power measured as outlined below.

That is, the aqueous medium containing the polyolefin-based resin beads, the styrene-based monomer and, if necessary, other dispersion and solution is supplied to a polymerization vessel of a polymerization apparatus, and then, a stirring wing is rotated at a predetermined rotation frequency to stir the aqueous medium. Thereupon, a rotation driving road necessary for rotating the stirring wing is measured as a current value $A_1$ (ampere). This current value $A_1$ is multiplied with an effective voltage (volt) to obtain a value of $P_1$ (watt).

Then, in the state where the polymerization vessel is empty, the stirring wing of the polymerization apparatus is rotated at the same rotation frequency as that described above, and a rotation driving road necessary for rotating the stirring wing is measured as a current value $A_2$ (ampere). This current value $A_2$ is multiplied with an effective voltage (volt) to obtain a value of $P_2$ (watt), and a power required for stirring can be calculated by the following Equation 2. V (m$^3$) is a volume of a whole aqueous medium containing the polyolefin-based resin bead, the styrene-based monomer and, if necessary, other dispersion and solution.

$$\text{Power required for stirring } (Pv)=(P_1-P_2)/V \qquad \text{Equation 2}$$

A shape and a structure of the polymerization vessel are not particularly limited as far as they have been conventionally used in polymerization of the styrene-based monomer.

The stirring wing is not particularly limited as far as a power required for stirring can be set in a predetermined range. Specifically, examples include paddle wings such as V-type paddle wing, inclined paddle wing, flat paddle wing, Furiydragon wing, and Pullmargine wing, turbine wings such as turbine wing and fan turbine wing, and propeller wings such as marine propeller wing. Among these stirring wings, paddle wing is preferable, and V-type paddle wing, inclined paddle wing, flat paddle wing, Furrydragon wing and Pullmargine wing are more preferable. A stirring wing may be a single stage wing or a multiple stage wing.

In addition, a size of a stirring wing is not particularly limited as far as a power required for stirring can be said in a predetermined range.

Further, the polymerization vessel may be provided with a baffle.

As the polymerization initiator, polymerization initiators which are generally used for polymerizing the styrene-based monomer can be used. Examples include organic peroxides such as benzoyl peroxide, lauryl peroxide, t-amyl peroxyoctoate, t-butyl peroxybenzoate, t-amyl peroxybenzoate, t-butyl peroxypivalate, t-butyl peroxyisopropyl carbonate, t-butyl peroxyacetate, t-butyl peroxy-3,3,5-trimetliylcyclohexanoate, di-t-butyl peroxyhexahyclroteleplhtalate, 2,2-di-t-butyl peroxybulane, and dicumyl peroxide, and azo compounds such as azobisisobutyronitrile and azobisdimethylvaleronitrile. Polymerization initiators may be used singly or in combination.

How to add the polymerization initiator to the aqueous medium is not particularly limited, but it is preferable to add by the following manner. That is, it is preferable that, the polymerization initiator is added at 0.02 to 2.0% by weight of a total amount of the polyolefin-based resin beads and the styrene-based monomer to be used until an amount of the styrene-based monomer to be used reaches 90% by weight of the total amount. It is preferable that the polymerization initiator is added until the amount reaches more preferably 85% by weight, particularly 80% by weight of the total amount. A more preferable amount of the polymerization initiator is 0.10 to 1.50% by weight relative to the total amount.

According to the aforementioned addition manner, a polymerization rate of the styrene-based monomer in the polyolefin-based resin bead can be improved, and a composition ratio of the polyolefin-based resin at a part near a surface of the resulting modified resin bead can be increased. As a result, a strength of the expanded molded article obtained by expansion-molding the modified resin beads can be improved.

Further, it is preferable that addition of the polymerization initiator is performed to the aforementioned predetermined amount via the styrene-based monomer containing the polymerization initiator. As a remaining styrene-based monomer, a monomer containing no polymerization initiator may be used.

As the reason why the styrene-based monomer containing the polymerization initiator is used, the following reasons are contemplated.

That is, by making the polymerization initiator to be contained in the styrene-based monomer and then absorbing this in the polyolefin-based resin bead, the polymerization initiator together with the styrene-based monomer is effectively impregnated into a central part of the polyolefin-based resin bead. For this reason, at an early stage of a step of polymerizing the styrene-based monomer, the polymerization initiator at a necessarily amount for polymerization of the styrene-based monomer can be preferentially supplied to a central part of the polyolefin-based resin bead. As a result, the styrene-based monomer can be polymerized preferentially at a central part of the polyolefin-based resin bead.

Then, when the styrene-based monomer containing no polymerization initiator is added to the aqueous medium, this styrene-based monomer is smoothly polymerized under the polymerization initiator which is present rich at a central part of the polyolefin-based resin bead, while the monomer is sequentially absorbed into the polystyrene-based resin formed at a central part of the polyolefin-based resin bead. For this reason, the resulting modified resin bead becomes the state where the polystyrene-based resin is rich at a central part rather than around a surface.

An amount of the styrene-based monomer containing no polymerization initiator to be used is preferably 10 to 60% by weight, more preferably 15 to 60% by weight, particularly preferably 20 to 55% by weight of a total amount of a styrene-based monomer to be used. When an addition amount is less than 10% by weight, it is not preferable because a ratio of the polystyrene-based resin at a part near a surface of the modified resin bead becomes great in some cases. In this case, impact resistance and chemical resistance of the expanded molded article obtained by secondarily expanding the pre-expanded beads obtained from the modified resin beads are lowered in some cases. On the other hand, when an addition amount is more than 60% by weight, it causes undesirable result that a polymerization rate of the styrene-based monomer is lowered, and a large amount of the styrene-based monomer remains in the modified resin bead in some cases.

As a method of adding a styrene-based monomer containing the polymerization initiator to the aqueous medium, many methods are exemplified. Examples include:

(1) a method of dissolving the polymerization initiator in the styrene-based monomer in a vessel other than the polymerization vessel to which the aqueous medium has been supplied to make the styrene-based monomer into contain the initiator, and supplying this styrene-based monomer to the aqueous medium in the polymerization vessel, (2) a method of dissolving the polymerization initiator in a part of the styrene-based monomer, a solvent or a plasticizer to prepare a solution, and simultaneously supplying this solution and a predetermined amount of the styrene-based monomer to the aqueous medium in the stirring state, in the polymerization vessel, (3) a method of preparing a dispersion in which the polymerization initiator is dispersed in an aqueous medium, and simultaneously supplying this dispersion and the styrene-based monomer to the aqueous medium in the stirring state, in the polymerization vessel.

A temperature of the aqueous medium upon polymerization of the styrene-based monomer in the polyolefin-based resin bead is not particularly limited, but is preferably in the range of −30 to +10° C. of a melting point of the polyolefin-based resin. More specifically, a temperature of the aqueous medium is preferably 70 to 140° C., and 80 to 130° C. is more preferable. Moreover, a temperature of the aqueous medium may be a constant temperature during a term from initiation of polymerization of the styrene-based monomer to completion of the polymerization, or may be stepwise raised. When a temperature of the aqueous medium is raised, it is preferable that a temperature is stepwise raised at a temperature raising rate of 0.1 to 2° C./min.

Further, when a bead composed of a crosslinked polyolefin-based resin is used, crosslinking may be performed in advance before impregnation of the styrene-based monomer, or may be performed during impregnation of the styrene-based monomer into the polyolefin-based resin bead and polymerization of the monomer, or may be performed after impregnation of the styrene-based monomer into the polyolefin-based resin bead and the polymerization of them.

Examples of a crosslinking agent used for crosslinking the polyolefin-based resin include organic peroxides such as 2,2-di-t-butyl-peroxybutane, dicumyl peroxide, and 2,5-dimethyl-2,5-di-t-butyl peroxyhexane. The crosslinking agents may be used singly, or two or more combination thereof. Usually, it is preferable that an amount of crosslinking agent to be used is 0.05 to 1.0 part by weight relative to 100 parts by weight of the polyolefin-based resin beads.

As a method of adding the crosslinking agent, for example, a method of directly adding the crosslinking agent to the polyolefin-based resin, a method of dissolving the crosslinking agent in a solvent, a plasticizer or the styrene-based monomer and then adding the solution, and a method of dispersing the crosslinking agent in water and then adding the dispersion. Among them, a method of dissolving the crosslinking agent in the styrene-based monomer, and then adding the solution is preferable.

The modified resin bead is impregnated with the blowing agent (step (b)). A method of impregnating the modified resin bead with the blowing agent can be appropriately changed depending on a kind of the blowing agent. Examples include a method of pressing the blowing agent into the aqueous medium with the modified resin bead dispersed therein to impregnate the modified resin bead with the blowing agent, and a method of supplying the modified resin bead to a rotation mixer and pressure-injecting the blowing agent into this rotation mixer to impregnate the modified resin bead with the blowing agent. A temperature for impregnating the modified resin bead with the blowing agent is usually 50 to 140° C.

Herein, examples of the blowing agent include volatile blowing agents such as propane, butane, pentane and dimethyl ether. The blowing agents may be used singly or in combination. An amount of the blowing agent to be added is preferable 5 to 25 parts by weight relative to 100 parts by weight of the modified resin beads.

Further, a co-blowing agent may be used with the blowing agent. Examples of such the co-blowing agent include solvents such as toluene, xylene, ethylbenzene, cyclohexane, and D-limonene, and plasticizers (high boiling point solvents) such as diisobutyl adipate, diacetylated glycerin monolaurate, and coconut oil. An amount of the co-blowing agent to be used is preferably 0.1 to 2.5 parts by weight relative to 100 parts by weight of the modified resin beads.

In addition, a surface treating agent such as a binding preventing agent, a fusion promoter, an antistatic agent, and a spreader may be added to a modified resin bead.

The binding preventing agent plays a role in preventing adhesion of mutual pre-expanded beads upon pre-expansion of the modified resin beads. Herein, adhesion means that a plurality of pre-expanded beads are adhered and incorporated. Examples include talc, calcium carbonate, zinc stearate, aluminum hydroxide, ethylenebisstearic acid amide, tri calcium phosphate, and dimethylpolysiloxane.

The fusion promoter plays a role in promoting fusion of mutual pre-expanded beads upon secondary expansion molding of the pre-expanded beads. Examples include stearic acid, stearic acid triglyceride, hydroxystearic acid triglyceride, and stearic sorbitan acid ester.

Examples of the antistatic agent include polyoxyethylene alkylphenol ether, and stearic acid monoglyceride.

Examples of the spreader include polybutene, polyethylene glycol, and silicone oil.

It is preferable that a total amount of the surface treating agent to be used is 0.01 to 2.0 parts by weight relative to 100 parts by weight of the modified resin beads.

By heating the modified resin beads impregnated with the volatile blowing agent using a heating medium such as water vapor, the modified resin beads are pre-expanded to a predetermined bulk density, whereby, the pre-expanded beads can be obtained (step (c)).

Further, by charging the pre-expanded beads into a mold of a molding machine, and heating these to secondarily expand to fuse and incorporate pre-expanded beads, the expanded molded article having a desired shape can be obtained. As the molding machine, molding machines which are used upon preparation of an expanded molded article from a polystyrene-based resin pre-expanded bead can be used.

As described above, the pre-expanded bead contains the polystyrene-based resin at a high ratio in a central part thereof, and contains the polyolefin-based resin at a high ratio in a part near a surface.

Therefore, upon secondary expansion of the pre-expanded bead, the pre-expanded beads can be thermally fused and incorporated firm due to the polyolefin-based resin contained at a large amount on the surface thereof. In addition, excellent expansion moldability due to the polystyrene-based resin contained at a large amount in the central part of the pre-expanded bead can be also manifested.

A whole surface of the resulting expanded molded article contains the polyolefin-based resin derived from a polyolefin-based resin at a part near a surface of the pre-expanded beads, at a high ratio. In other words, since the expanded molded beads have a surface containing a polyolefin-based resin at a high ratio, the article is provided with excellent chemical resistance and impact resistance.

Moreover, since the interior of each expanded bead constituting the expanded molded article composes of an expanded central part of the pre-expanded bead and contains the polystyrene-based resin at a high ratio, the expanded molded article also has excellent stiffness.

The expanded molded article obtained as described above can be used in various utilities such as a core material for a vehicle bumper, a vehicle cushioning material such as a door interior cushioning material, and a container for conveying foods, an electronic part and various industrious materials etc,. In particular, the article can be suitably used as the vehicle cushioning material.

EXAMPLES

The present invention will be specifically explained by way of Examples below, but the present invention is not limited to them. Methods of measuring a bulk density, an absorbance ratio, a maximum content of a styrene-based monomer, a "z" average molecular weight of a polystyrene-based resin as measured by GPC, a fusion ratio, a compression strength, impact resistance, and chemical resistance in the following Examples will be described below.

(Maximum Content of Styrene-Based Monomer)

A part of polyolefin-based resin beads which was impregnated with a styrene-based monomer and was being polymerized was taken out of a polymerization vessel, and separated from an aqueous medium and, thereafter, a moisture on a surface of the polyolefin-based resin bead was removed with a gauze to obtain a sample for measurement.

Then, 0.08 g was precisely weighed from the sample for measurement, and was immersed in 40 milliliters of toluene for 24 hours to extract the styrene-based monomer. Ten milliliters of a Wijs reagent, 30 milliliters of a 5% by weight aqueous potassium iodide solution and about 30 milliliters of a 1% by weight aqueous starch solution were placed into a solution in which this styrene-based monomer had been extracted therein, and this was titrated with a N/40 sodium thiosulfate-solution to obtain a titration number (milliliter) of a sample. A Wijs reagent was prepared by dissolving 8.7 g of iodine and 7.9 g of iodine trichloride in 2 liters of glacial acetic acid.

In addition, titration was performed according to the same manner as that described above without immersing the sample for measurement in toluene, and a titration number (milliliter) of a blank was obtained. Then, a content of a styrene-based monomer in a polyolefin-based resin bead was calculated based on the following equation:

Content (% by weight) of styrene-based monomer=0.1322×(titration number of blank−titration number of sample)/weight (g) of sample for measurement The aforementioned measurement was performed every 20 minutes from initiation of addition of a styrene-based monomer to an aqueous medium, and a content of a styrene-based monomer which was most was adopted as a maximum content of a styrene-based monomer.

(Bulk Density)

A bulk density of a pre-expanded bead was measured according to the following manner:

First, a pre-expanded bead was charged into a 500 cm$^3$ measuring cylinder to a division of 500 cm$^3$.

The measuring cylinder was seen with eyes from a horizontal direction, if even one pre-expanded bead reaches a division of 500 cm$^3$, charging of a pre-expanded bead into a measuring cylinder was completed at that time.

Then, a weight of pre-expanded beads charged into the measuring cylinder was weighed at a significant figure of 2 places of decimals, and the weight was regarded as W (g). Then, a bulk density of a pre-expanded bead was calculated by the following equation:

Bulk density (g/cm$^3$)=W/500

(Absorbance Ratio)

An absorbance ratio ($D_{698}/D_{2850}$) was measured by the following manner. That is, surfaces of randomly selected 10 respective pre-expanded beads were subjected to bead surface analysis by ATR method infrared spectroscopy to obtain an infrared absorbing spectrum. From respective infrared absorption spectra, each absorbance ratio ($D_{698}/D_{2850}$) was calculated, and a minimum absorbance ratio and a maximum absorbance ratio were excluded. Then, an arithmetic average of remaining 8 absorbance ratios was regarded as absorbance ratio ($D_{698}/D_{2850}$). An absorbance ratio ($D_{698}/D_{2850}$) was measured, for example, using a measuring apparatus sold from Nicolet Instrument Corp. under trade name "Fouerir transformation infrared spectrometer MAGMA560".

("z" Average Molecular Weight of Polystyrene-based Resin)

About 60 mg of pre-expanded beads were collected, each pre-expanded bead was divided into two using a cutter, and then immersed in 10 milliliters of chloroform at room temperature for 24 hours.

Thereafter, chloroform was filtered with a non-aqueous 0.45 μm chromatography disc, and a "z" average molecular weight in terms of polystyrene was measured using GPC (gel permeation chromatography).

Measuring apparatus: trade name "LIPLC Detector 484, Pump510" manufactured by Waters Corporation Measuring Conditions Column: two columns, trade name "Shodex GPC K-806L (diameter 8.0×300 mm)" manufactured by SHOWA DENKO K.K.

Column temperature: 40° C., mobile phase: chloroform, mobile phase flow rate: 1.2 milliliter/min Injection•pump temperature: room temperature, measuring time: 25 mins, detection: ultraviolet-ray 254 nm Injection amount: 50 microliters Standard polystyrene for calibration curve Trade name "Shodex" manufactured by SHOWA DENKO K.K., molecular weight: 1,030,000

Manufactured by Tosoh Corporation, molecular weight: 5,480,000, 3,840,000, 355,000, 102,000, 37,900, 9,100, 2,630, 495

(Fusion Rate)

A cut line having a length of 300 mm and a depth of 5 mm was carved traversely on a surface of an expanded molded article having a rectangular parallelepiped shape of a length 400 mm×a width 300 mm×a height 50 mm with a cutter, and the expanded molded article was divided into two along this cut line. Then, in a divided plane of the expanded molded article, the number (a) of expanded beads which were broken in an expanded bead, and the number (b) of expanded beads which were broken at an interface between expanded beads were measured, and a fusion rate was calculated based on the following equation:

Fusion rate (%)=100×(a)/[(a)+(b)]

(Compression Strength)

A test piece having a planar rectangular shape of a length 50 mm×a width 50 mm×a thickness 25 mm was cut from an expanded molded article, and a 5% compression strength of this test piece was measured according to JIS K6767. A compression rate was 10 mm/min.

(Impact Resistance)

A test piece having a planar rectangular shape of a length 215 mm×a width 40 mm×a thickness 20 mm was cut from an expanded molded article. Then, according to JIS K7211, the test piece was bridged between a pair of supporting points disposed at an interval of 150 mm, a 321 g steel ball was fallen, and a fallen ball impact value, that is, a 50% breakage height was calculated based on the following equation, provided that a maximum height of the steel ball was 120 cm.

50% Breakage height $H_{50}=Hi+d[\Sigma(i\times ni)/N\pm 0.5]$ wherein, $H_{50}$: 50% breakage height (cm)

Hi: a height (cm) of a test piece when a height level (i) is 0, and this is a height at which a test piece is predicted to be broken.

d: a height interval (cm) when a height of a test piece is raised and fallen i: a height level which is increased or decreased by one, letting a level at Hi to be 0.

(i)=( . . . −3, −2, −1, 0, 1, 2, 3, . . . )

ni: a number of test pieces which were broken (or not broken) at each level

N: a total number of broken (or not broken) test pieces (N=Σni)

Data having the more number of them was used.

When they are the same number, any of them may be adopted.

±0.5: When data of breakage are used, negative is adopted and, when data of non-breakage are used, positive is adopted.

(Chemical Resistance)

Three plate-like test pieces having a planar rectangular shape of a length 100 mm×a width 100 mm×a thickness 20 nm were excised from an expanded molded article, and were allowed to stand for 24 hours under conditions of 23° C. and a humidity of 50%. Test pieces were excised from an expanded molded article so that a whole upper surface of a test piece was a surface of the expanded molded article.

Then, 1 g of separate chemicals (gasoline, kerosene, dibutyl phthalate (DBP)) were uniformly coated every upper surface of three test pieces, and allowed to stand for 60 minutes under conditions of 23° C. and a humidity of 50%. Thereafter, the chemicals were wiped off from an upper surface of the test pieces, the upper surface of the test piece was observed with eyes, and determined based on the following criteria:

| | |
|---|---|
| ○: Better | No change |
| Δ: Slightly worse | Softened surface |
| X: Worse | Depression of surface (shrinkage) |

Example 1

One-hundred parts by weight of an ethylene-vinyl acetate copolymer (EVA) (manufactured by Nippon Unicar Company Limited, trade name "NUC-3221", vinyl acetate content: 5% by weight, melting point: 107° C., melt flow rate: 0.5 g/10 min, density: 0.93 g/cm$^3$) and 0.5 part of weight of synthetic hydrous silicon dioxide were supplied to an extruder, melt and kneaded, and granulated by an in-water cutting format to obtain polyolefin-based resin beads having an elliptic sphere shape (egg-shape). An average weight of a polyolefin-based resin beads was 0.60 mg. A melt flow rate and a density of an ethylene-vinyl acetate copolymer are values measured according to JIS K6992-2.

A polymerization apparatus in which a V-type paddle wing 4 (stirring wing: 3 wings, stirring wing radius $d_1$: 585 mm, stirring wing width $d_2$: 315 mm) was provided in a polymerization vessel 3 having an inner diameter of 1800 mm, a straight barrel part length of 1890 mm and an inner volume of 6.4 m$^3$ was prepared. Into a polymerization vessel of this polymerization apparatus were supplied 100 parts by weight of water at 70° C., 0.8 part by weight of magnesium pyrophosphate and 0.02 part by weight of sodium dodecylbenzenesulfonate while stirring with a V-type paddle wing 4, to obtain an aqueous medium. Thereafter, 40 parts by weight of the aforementioned polyolefin-based resin beads was suspended in the aqueous medium while stirring with a V-type paddle wing 4. Then, an aqueous medium was heated to 85° C., and thereafter, a rotation frequency of a V-type paddle wing 4 was adjusted so that a power required for stirring was maintained at 0.20 kw/m$^3$.

As shown in FIG. 7, in the polymerization vessel 3 of the polymerization apparatus, a cylindrical circumferential wall part 32 is projected upwardly from an outer circumferential edge of a bottom part 31 having a cross-sectional convex arc shape. Further, an upper end opening part of a circumferential wall part 32 is closed with a ceiling part 33 having a cross-sectional convex. The V-type paddle wing 4 as a stirring wing is attached to a lower end part of a rotation axis 33a hung from a ceiling part 33 of this polymerization vessel 3.

This V-type paddle wing 4 is composed of an attachment part 41 for attaching to a rotation axis 33a, and three stirring wings 42 having a side parallelogram shape which are integratedly provided on an outer circumferential surface of the attachment part 41 in a horizontal direction at an equal interval. Each stirring wing 42 is directed slantingly outerwardly in an upper part.

In FIG. 7, 61 means a motor for rotating the V-type paddle swing 4, 62 is an inverter for controlling a rotation frequency of the motor, 63 is an ammeter for measuring a loaded current value, and 64 means an electric source.

On the other hand, 0.15 part by weight of benzoyl peroxide and 0.01 part by weight of t-butyl peroxybenzoate as polymerization initiators, as well as 0.25 part by weight of dicumyl peroxide as a crosslinking agent were dissolved in 20 parts by weight of styrene monomer (St) to prepare a first styrene-based monomer. In addition, 0.05 part by weight of ethylenebisstearic acid amide as a cell-nucleating agent was dissolved in 40 parts by weight of styrene monomer (St) to prepare a second styrene-based monomer.

Then, the first styrene-based monomer was continuously added dropwise to the aforementioned aqueous medium at a rate of 10 parts by weight per hour, and the styrene monomer was polymerized in the polyolefin-based resin bead while the styrene monomer, the polymerization initiators and the crosslinking agent were impregnated into the polyolefin-based resin beads.

Next, after that addition of the first styrene-based monomer to the aqueous medium was completed, the second styrene-based monomer was continuously added dropwise to the aqueous medium at a rate of 20 parts by weight per hour, and the styrene monomer was polymerized in a polyolefin-based resin bead while the styrene monomer and the cell-nucleating agent were impregnated into the polyolefin-based resin beads.

Further, after addition of the second styrene-based monomer to the aqueous medium while the aqueous medium was stirred, followed by allowing to stand for 1 hour, the aqueous medium was heated to 140° C. and retained for 3 hours. Thereafter, the polymerization vessel was cooled to obtain modified resin beads.

Subsequently, 100 parts by weight of modified resin beads, 1.0 part by weight of water, 0.15 part by weight of stearic acid monoglyceride and 0.5 part by weight of diisobutyl adipate were supplied to a pressure resistant V-type rotation mixer leaving an inner volume of 1 m$^3$, and 14 parts by weight of butane was pressure-injected therein at a normal temperature while rotating. And the temperature of the interior of a rotation mixer was raised to 70° C., retained for 4 hours, and then cooled to 25° C. to obtain an expandable modified resin beads.

The resulting expandable modified resin beads were immediately supplied to a pre-expanding machine (trade name "SKK-70" manufactured by Sekisui Machinery Co., LTD.), and pre-expanded using water vapor at a pressure of 0.02 MPa to obtain a pre-expanded beads having the bulk density of 0.06 g/cm$^3$.

Then, the pre-expanded beads were allowed to stand at room temperature for 7 days, and then charged into a mold of a molding machine (trade name "ACE-3SP" manufactured by Sekisui Machinery Co., LTD.). Thereafter, water vapor was supplied to the mold to secondarily expand the pre-expanded beads, to prepare an expanded molded article having a rectangular parallelepiped shape of a length 400 mm×a width 300 mm×a height 50 mm.

Example 2

According to the same manner as that of Example 1 except that a power required for stirring was maintained at 0.08 kw/m³, pre-expanded beads and an expanded molded article were obtained.

Example 3

According to the same manner as that of Example 1 except that a power required for stirring was maintained at 0.50 kw/m³, pre-expanded beads and an expanded molded article were obtained.

Example 4

According to the same manner as that of Example 1 except that an amount of the styrene monomer of the first styrene-based monomer was changed from 20 parts by weight to 40 parts by weight, and an amount of the styrene monomer of the second styrene-based monomer was changed from 40 parts by weight to 20 parts by weight, pre-expanded beads and an expanded molded article were obtained.

Example 5

According to the same manner as that of Example 1 except that the polyolefin-based resin beads suspended in an aqueous medium were 15 parts by weight, 0.25 part by weight of benzoyl peroxide and 0.02 part by weight of t-butyl peroxybenzoate as polymerization initiators, as well as 0.15 part by weight of dicumyl peroxide as a crosslinking agent were dissolved in 30 parts by weight of styrene monomer to prepare a first styrene-based monomer, the first styrene-based monomer was added dropwise to the aqueous medium at a rate of 10 parts by weight per hour, 0.14 part by weight of ethylenebisstearic acid amide as a cell-nucleating agent was dissolved in 55 parts by weight of styrene monomer to prepare a second styrene-based monomer, and the second styrene-based monomer was added dropwise to the aqueous medium at a rate of 15 parts by weight per hour, pre-expanded beads and an expanded molded article were obtained.

Example 6

According to the same manner as that of Example 1 except that polyolefin-based resin beads suspended in the aqueous medium were 10 parts by weight, 0.30 part by weight of benzoyl peroxide and 0.02 part by weight of t-butyl peroxybenzoate as polymerization initiators, as well as 0.10 part by weight of dicumyl peroxide as a crosslinking agent were dissolved in 30 parts by weight of styrene monomer to prepare a first styrene-based monomer, the first styrene-based monomer was added dropwise to an aqueous medium at a ratio of 10 parts by weight per hour, 0.14 part by weight of ethylenebisstearic acid amide as a cell-nucleating agent was dissolved in 60 parts by weight of styrene monomer to prepare a second styrene-based monomer, and the second styrene-based monomer was added dropwise to the aqueous medium at a rate of 20 parts by weight per hour, pre-expanded beads and an expanded molded article were obtained.

Example 7

The expandable modified resin beads obtained in Example 5 were placed into a pre-expanding machine, and pre-expanded using water vapor at a pressure of 0.04 MPa to obtain pre-expanded beads having a bulk density of 0.015 g/cm³. Thereafter, according to the same manner as that of Example 1, an expanded particle article was obtained.

Example 8

The expandable modified resin beads obtained in Example 1 were placed into the pre-expanding machine, and pre-expanded using water vapor at a pressure of 0.01 MPa to obtain pre-expanded beads having a bulk density of 0.15 g/cm³. Thereafter, according to the same manner as that of Example 1, an expanded molded article was obtained.

Example 9

One-hundred parts by weight of linear low-density polyethylene (LLDPE) (manufactured by Nippon Unicar Company Limited, trade name "TUF-2032", melting point: 125° C., melt flow rate: 0.9 g/10 min, density: 0.923 g/cm³) and 0.3 part by weight of talc were supplied to an extruder, melted and kneaded, and granulated by an in-water cutting format to obtain a polyolefin-based resin beads having an elliptic sphere shape (egg-shape). An average weight of the polyolefin-based resin beads was 0.50 mg. A melt flow rate and a density of linear low-density polyethylene were measured according to JIS K6767.

Using the same polymerization apparatus as that of Example 1, 100 parts by weight of water at 70° C., 0.8 part by weight of magnesium pyrophosphate and 0.02 part by weight of sodium dodecylbenzenesulfonate were supplied to the polymerization vessel 3 of this polymerization apparatus while stirring with the V-type paddle wing 4, to obtain an aqueous medium. Thereafter, 35 parts by weight of the aforementioned polyolefin-based resin beads was suspended in the aqueous medium while stirring with the V-type paddle wing 4. Then, the aqueous medium was heated to 125° C., and thereafter, a rotation frequency of the V-type paddle wing 4 was adjusted so that a power required for stirring was maintained at 0.20 kw/m³ that follow.

On the other hand, 0.15 part by weight of dicumyl peroxide as a polymerization initiator was dissolved in 20 parts by weight of styrene monomer to prepare a first styrene-based monomer.

Then, the first styrene-based monomer was continuously added dropwise to the aqueous medium at a rate of 10 parts by weight per hour, and the styrene monomer was polymerized in the polyolefin-based resin beads while the styrene monomer and the polymerization initiator were impregnated into polyolefin-based resin beads.

Next, after addition of the first styrene-based monomer to the aqueous medium was completed, 45 parts by weight of styrene monomer was continuously added dropwise to the aqueous medium at a rate of 20 parts by weight per hour, and the styrene monomer was polymerized in the polyolefin-based resin beads while the styrene monomer was impregnated into the polyolefin-based resin beads. This styrene monomer was described in a column of a second styrene-based monomer in Table 1, for convenience.

Further, after that addition of the styrene monomer to the aqueous medium while stirring the aqueous medium was completed, and this was allowed to stand for 1 hour, the aqueous medium was heated to 140° C., and retained for 1 hour. Thereafter, the polymerization vessel was cooled to obtain modified resin beads.

Subsequently, 100 parts by weight of the modified resin beads, 0.15 part by weight of stearic acid monoglyceride and 0.5 part by weight of diisobutyl adipate were supplied to a pressure resistant V-type rotation mixer having an inner volume of 1 m³, and 14 parts by weight of butane was pressure-injected therein at a normal temperature while rotating. Then, a temperature of the interior of a rotation mixer was raised to 80° C., retained for 3 hours, and cooled to 25° C. to obtain an expandable modified resin beads. The expandable modified resin beads were immediately pre-expanded using water vapor to obtain pre-expanded beads having a bulk density of 0.06 g/cm³.

Next, the pre-expanded beads were allowed to stand at room temperature for 7 days, and charged into a mold of a molding machine (trade name "ACE-3SP" manufactured by Sekisui Machinery Co., LTD.). Then, water vapor was supplied to the mold to secondarily expand the pre-expanded beads, to prepare an expanded molded article having a rectangular parallelepiped shape of a length 400 mm×a width 300 mm×a height 50 mm.

Example 10

According to the same manner as that of Example 1 except that, in a polymerization vessel, a polymerization apparatus provided with a falling-type 45° inclination paddle wing 5 (stirring wing: 4 wings, stirring wing radius $d_1$: 550 mm, stirring wing width $d_2$: 280 mm) at upper and lower two stage as shown in FIG. 8 in place of the V-type paddle wing was used, and a rotation frequency of the inclination paddle wing 5 immediately before addition of the first styrene-based monomer to the aqueous medium was retained constant until preparation of a modified resin beads was completed, a pre-expanded bead and an expanded molded article were obtained.

Herein, the polymerization vessel 3 of the polymerization apparatus having the same structure as that of Example 1 was used, and the falling-type 45° inclination paddle wing 5 as a stirring wing is attached to each of a lower end part of a rotation axis 33a hung from a ceiling part 33 of this polymerization vessel 3 and a central part in an upward and downward direction.

This falling-type 45° inclination paddle wing 5 is composed of an attachment part 51 for attaching to a rotation axis 33a and four stirring wings 52 having a side transversely long rectangular shape which are integratedly provided on an outer circumferential surface of this attachment part 51 in a horizontal direction at an equal interval. Each stirring wing 52 is in the state where it is directed in a horizontal direction and, at the same time, it is slantingly inclined at 45° forwardly from an upper end to a lower end relative to a rotation progression direction.

Further, baffles 7 are disposed in the polymerization vessel 3. The baffle 7 are disposed on a side wall of the polymerization vessel 3 so that they are in a mutually 90° positional relationship, when seen from an upper side of the polymerization vessel 3. A width of the baffles 7 are 100 mm, and a length thereof is 1890 mm.

A power required for stirring immediately before addition dropwise of the first styrene-monomer to the aqueous medium (initial power required for stirring) is 0.20 kw/m³, and a power required for stirring at completion of preparation of modified resin beads (final power required for stirring) is 0.29 kw/m³.

Example 11

One-hundred parts by weight of branched low-density polyethylene (LDPE) (manufactured by Nippon Unicar Company Limited, trade name "DFDJ-6775", melting point: 112° C., melt flow rate: 0.2 g/10 min, density: 0.92 g/cm³) and 0.5 part by weight of synthetic hydrous silicon dioxide were supplied to an extruder, melted and kneaded, and granulated by an in-water cutting format to obtain polyolefin-based resin beads having an elliptic sphere shape (egg-shape). An average weight of the polyolefin-based resin beads was 0.75 mg. A melt flow rate and a density of branched low-density polyethylene were measured according to JIS K6767. According to the same manner as that of Example 10 except that the polyolefin-based resin beads were used, a pre-expanded beads and an expanded molded article were obtained. An initial power required for stirring was 0.20 kw/m³, and a final power required for stirring was 0.29 kw/m³.

Example 12

According to the same manner as that of Example 11 except that an initial power required for stirring was adjusted to be 0.08 kw/m³, pre-expanded beads and an expanded molded article were obtained. A final power required for stirring was 0.13 kw/m³.

Example 13

According to the same manner as that of Example 11 except that an initial power required for stirring was adjusted to be 0.45 kw/m³, pre-expanded beads and an expanded molded article were obtained. A final power required for stirring was 0.68 kw/m³.

Comparative Example 1

According to the same manner as that of Example 1 except that a power required for stirring was adjusted to be 0.04 kw/m³, pre-expanded beads and an expanded molded article were obtained.

Comparative Example 2

According to the same manner as that of Example 1 except that a power required for stirring was 0.90 kw/m³, we tried to obtain pre-expanded beads. However, since modified resin beads were flat, pre-expanded beads and an expanded molded article could not be obtained.

Comparative Example 3

According to the same manner as that of Example 1 except that a power required for stirring was 0.04 kw/m³, 0.15 part by weight of benzoyl peroxide and 0.01 part by weight t-butyl peroxybenzoate as polymerization initiators, 0.25 part by weight of dicumyl peroxide as a crosslinking agent, as well as 0.05 part by weight of ethylenebisstearic acid amide as a cell-nucleating agent were dissolved in 60 parts by weight of styrene monomer to prepare a first styrene-based monomer, and this first styrene-based monomer was added dropwise to the aqueous medium at a rate of 15 parts by weight per hour, without using a second styrene-based monomer, pre-expanded beads and an expanded molded article were obtained.

Comparative Example 4

According to the same manner as that of Comparative Example 3 except that a power required for stirring was 0.20 kw/m³, pre-expanded beads and an expanded molded article were obtained.

Comparative Example 5

According to the same manner as that of Example 1 except that polyolefin-based resin beads suspended in the aqueous medium were 60 parts by weight, 0.1 part by weight of benzoyl peroxide and 0.01 part by weight of t-butyl peroxybenzoate as polymerization initiators, as well as 0.35 part by weight of dicumyl peroxide as a crosslinking agent were dissolved in 10 parts by weight of styrene monomer to prepare a first styrene-based monomer, the first styrene-based monomer was added dropwise to an aqueous medium at a rate of 10 parts by weight per hour, 0.04 part by weight of ethylenebisstearic acid amide as a cell-nucleating agent was dissolved in 30 parts by weight of styrene monomer to prepare a second styrene-based monomer, and the second styrene-based monomer was added dropwise to an aqueous medium at a rate of 15 parts by weight per hour, pre-expanded beads were obtained.

Then, according to the same manner as that of Example 1 except that the pre-expanded beads were allowed to stand at room temperature only for one day, an expanded molded bead was obtained.

Comparative Example 6

According to the same manner as that of Example 1 except that polyolefin-based resin beads suspended in the aqueous medium were 8 parts by weight, 0.32 part by weight of benzoyl peroxide and 0.02 part by weight of t-butyl peroxybenzoate as polymerization initiators, as well as 0.10 part by weight of dicumyl peroxide as a crosslinking agent was dissolved in 30 parts by weight of styrene monomer to prepare a first styrene-based monomer, the first styrene-based monomer was added dropwise to an aqueous medium at a rate of 10 parts by weight per hour, 0.14 part by weight of ethylenebisstearic acid amide as a cell-nucleating agent was dissolved in 62 parts by weight of styrene monomer to prepare a second styrene-based monomer, and the second styrene-based monomer was added dropwise to the aqueous medium at a rate of 21 parts by weight per hour, pre-expanded beads and an expanded molded article were obtained.

Comparative Example 7

Ethylene-propylene random copolymer pre-expanded beads (ethylene-random copolymer: ethylene component=3.5% by weight, average weight: 2 mg) having a bulk density of 0.06 g/cm$^3$ were secondarily expanded in a mold using a high pressure molding machine to obtain an expanded molded article. In Table 2, an ethylene-propylene random copolymer is expressed as "PP".

Comparative Example 8

According to the same manner as that of Example 1 except that expandable polystyrene beads (trade name "Eslenebeads HDS" manufactured by Sekisui Plastics Co., Ltd.) were pre-expanded to a bulk density of 0.06 g/cm$^3$ to obtain polystyrene pre-expanded beads. Then, according to the same manner as that of Example 1, the polystyrene pre-expanded beads were secondarily expanded to obtain an expanded molded article. In Table 2, polystyrene is expressed as "PSt".

Comparative Example 9

According to the same manner as that of Example 11 except that an initial power required for stirring was adjusted to be 0.04 kw/m$^3$, a pre-expanded beads and an expanded molded article were obtained. A final power required for stirring was 0.06 kw/m$^3$.

Comparative Example 10

According to the same manner as that of Example 11 except that an initial power required for stirring was adjusted to be 0.90 kw/m$^3$, we tried to obtain pre-expanded beads. However, since the resulting modified resin beads were flat, pre-expanded beads and an expanded molded article could not be obtained. A final power required for stirring (Pv) was 1.25 kw/m$^3$.

In Examples 1 to 13 and Comparative Examples 1 to 10, an absorbance ratio ($D_{698}/D_{2850}$) of a pre-expanded bead, a "z" average molecular weight of a polystyrene-based resin in a pre-expanded bead as measured by GPC, a maximum content of a styrene-based monomer in a polyolefin-based resin bead during polymerization of a styrene-based monomer, and a fusion rate, a compression strength, impact resistance and chemical resistance of an expanded molded article are shown in Tables 1 to 3.

TABLE 1

| | | Example | | | | | | | | |
|---|---|---|---|---|---|---|---|---|---|---|
| | | 1 | 2 | 3 | 4 | 5 | 6 | 7 | 8 | 9 |
| manufacturing condition | polyolefin-based resin beads (parts by weight) | EVA (40) | EVA (40) | EVA (40) | EVA (40) | EVA (15) | EVA (10) | EVA (15) | EVA (40) | LLDPE (35) |
| | power required for stirring (kw/m$^3$) | 0.20 | 0.08 | 0.50 | 0.20 | 0.20 | 0.20 | 0.20 | 0.20 | 0.20 |
| | first styrene-based monomer (parts by weight) | St (20) | St (20) | St (20) | St (40) | St (30) | St (30) | St (30) | St (20) | St (20) |
| | second styrene-based monomer (parts by weight) | St (40) | St (40) | St (40) | St (20) | St (55) | St (60) | St (55) | St (40) | St (45) |
| | maxium content of styrene-based monomer (wt %) | 21.1 | 26.8 | 16.7 | 28.2 | 28.9 | 27.5 | 28.9 | 21.1 | 16.5 |
| pre-expanded beads | bulk density (g/cm$^3$) | 0.06 | 0.06 | 0.06 | 0.06 | 0.06 | 0.06 | 0.015 | 0.015 | 0.06 |
| | absorbance ratio ($D_{698}/D_{2850}$) | 1.30 | 2.23 | 0.90 | 1.79 | 1.43 | 1.63 | 1.43 | 1.30 | 2.14 |
| | "z" average molecular weight (×10$^4$) | 72.4 | 73.9 | 70.5 | 80.3 | 91.7 | 93.6 | 91.7 | 72.4 | 59.0 |
| | average amount (mg) | 1.52 | 1.51 | 1.53 | 1.52 | 4.12 | 6.05 | 4.12 | 1.52 | 1.44 |

TABLE 1-continued

|  |  | Example | | | | | | | | |
|---|---|---|---|---|---|---|---|---|---|---|
|  |  | 1 | 2 | 3 | 4 | 5 | 6 | 7 | 8 | 9 |
| expanded molded article | fusion rate (%) | 90 | 80 | 90 | 85 | 90 | 85 | 90 | 80 | 90 |
|  | compression strength (kPa) | 345 | 350 | 360 | 350 | 430 | 450 | 95 | 1480 | 370 |
|  | impact resistance (cm) | 79.5 | 65.5 | 85.5 | 70.5 | 42.5 | 41.5 | 20.5 | >120(*) | 119.5 |
|  | chemical resistance gasoline | ○ | ○ | ○ | ○ | ○ | Δ | ○ | ○ | ○ |
|  | kerosene | ○ | ○ | ○ | ○ | ○ | ○ | ○ | ○ | ○ |
|  | DBP | ○ | ○ | ○ | ○ | ○ | ○ | ○ | ○ | ○ |

(*)no destroied

TABLE 2

|  |  | Comparative Example | | | | | | | |
|---|---|---|---|---|---|---|---|---|---|
|  |  | 1 | 2 | 3 | 4 | 5 | 6 | 7 | 8 |
| manufacturing condition | polyolefin-based resin beads (parts by weight) | EVA (40) | EVA (40) | EVA (40) | EVA (40) | EVA (60) | EVA (8) | PP | PSt |
|  | power required for stirring (kw/m$^3$) | 0.04 | 0.90 | 0.04 | 0.20 | 0.20 | 0.20 |  |  |
|  | first styrene-based monomer (parts by weight) | St (20) | St (20) | St (60) | St (60) | St (10) | St (30) |  |  |
|  | second styrene-based monomer (parts by weight) | St (40) | St (40) | — | — | St (30) | St (62) |  |  |
|  | maxium content of styrene-based monomer (wt %) | 38.7 | 31.3 | 43.1 | 37.5 | 18.9 | 29.8 |  |  |
| pre-expanded beads | bulk density (g/cm$^3$) | 0.06 | — | 0.06 | 0.06 | 0.06 | 0.06 | 0.06 | 0.06 |
|  | absorbance ratio ($D_{698}/D_{2850}$) | 2.74 | — | 3.31 | 2.62 | 0.50 | 1.80 | — | — |
|  | "z" average molecular weight (×10$^4$) | 76.6 | — | 81.7 | 79.5 | 36.1 | 92.2 | — | — |
|  | average amount (mg) | 1.49 | — | 1.47 | 1.50 | 1.02 | 7.55 | 2.00 | 0.40 |
| expanded molded article | fusion rate (%) | 70 | — | 60 | 75 | 80 | 80 | 85 | 95 |
|  | compression strength (kPa) | 340 | — | 340 | 340 | 190 | 450 | 240 | 480 |
|  | impact resistance (cm) | 54.5 | — | 48.5 | 60.5 | >120(*) | 34.5 | 60.5 | 32.5 |
|  | chemical resistance gasoline | X | — | X | X | ○ | X | ○ | X |
|  | kerosene | Δ | — | Δ | Δ | ○ | X | ○ | X |
|  | DBP | Δ | — | Δ | Δ | ○ | Δ | ○ | X |

(*)no destroied

TABLE 3

|  |  | Example | | | | Comparative Example | |
|---|---|---|---|---|---|---|---|
|  |  | 10 | 11 | 12 | 13 | 9 | 10 |
| manufacturing condition | polyolefin-based resin beads (parts by weight) | EVA (40) | LDPE (40) | LDPE (40) | LDPE (40) | LDPE (40) | LDPE (40) |
|  | initial power required for stirring (kw/m$^3$) | 0.20 | 0.20 | 0.08 | 0.45 | 0.04 | 0.90 |
|  | final power required for stirring (kw/m$^3$) | 0.29 | 0.29 | 0.13 | 0.68 | 0.06 | 1.25 |
|  | first styrene-based monomer (parts by weight) | St (20) | St (20) | St (20) | St (20) | St (20) | St (20) |
|  | second styrene-based monomer (parts by weight) | St (40) | St (40) | St (40) | St (40) | St (40) | St (40) |
|  | maxium content of styrene-based monomer (wt %) | 20.2 | 21.5 | 27.7 | 15.9 | 39.5 | 32.8 |
| pre-expanded beads | bulk density (g/cm$^3$) | 0.06 | 0.06 | 0.06 | 0.06 | 0.06 | — |
|  | absorbance ratio ($D_{698}/D_{2850}$) | 1.29 | 1.21 | 2.20 | 0.98 | 2.79 | — |
|  | "z" average molecular weight (×10$^4$) | 70.6 | 73.9 | 70.5 | 80.3 | 75.3 | — |
|  | average amount (mg) | 1.52 | 1.90 | 1.89 | 1.92 | 1.87 | — |
| expanded molded article | fusion rate (%) | 90 | 85 | 80 | 85 | 70 | — |
|  | compression strength (kPa) | 330 | 345 | 330 | 335 | 320 | — |
|  | impact resistance (cm) | 78.5 | 67.5 | 54.5 | 60.5 | 42.5 | — |
|  | chemical resistance gasoline | ○ | ○ | ○ | ○ | X | — |
|  | kerosene | ○ | ○ | ○ | ○ | Δ | — |
|  | DBP | ○ | ○ | ○ | ○ | Δ | — |

From Tables 1 to 3, the following is seen.

(1) From Examples 1 to 8 and Comparative Examples 5 to 6, it is seen that when an mixing amount of a polystyrene-based resin is in the range of 1 to 10-fold relative to an mixing amount of a polyolefin-based resin, pre-expanded beads which can provide an expanded molded article having better property can be obtained.

(2) From Examples 1 to 8 and Comparative Examples 1, and 3 to 4, it is seen that when an absorbance ratio is in the range of 0.1 to 2.5, pre-expanded beads which can provide an expanded molded article having better property can be obtained.

(3) From Examples 1 to 8 and Comparative Examples 1 to 2, and Examples 11 to 13 and Comparative Examples 9 to 10, it is seen that when a power required for stirring is in the range of 0.06 to 0.8 kw/m$^3$, pre-expanded beads which can provide an expanded molded article having better property can be obtained.

(4) From Examples 1 to 8 and Comparative Examples 1, and 3 to 4, it is seen that when a maximum content of a styrene-based monomer is less than 35% by weight, pre-expanded beads which can provide an expanded molded article having better property can be obtained.

(5) From Examples 1 to 8 and Example 9, it is seen that even when a kind of polyolefin-based resin beads is changed, pre-expanded beads which can provide an expanded molded article having better property can be obtained.

(6) From Examples 1 to 9 and Comparative Examples 7 to 8, it is seen that pre-expanded beads composed of a polystyrene-based resin modified with a polyolefin-based resin can provide an expanded molded article having better property.

(7) From Examples 1 to 9 and Examples 10 to 13, it is seen that when a power required for stirring is in the range of 0.06 to 0.8 kw/m$^3$ even if a shape of a stirring wing is different, pre-expanded beads which can provide an expanded molded article having better property can be obtained.

(Electron Micrograph)

FIG. 1 is an electron micrograph obtained by photographing a surface of the pre-expanded bead obtained in Example 1 using SEM at a magnification of 1500.

FIG. 2 is an electron micrograph obtained by photographing a cross-section of a part near a surface of the pre-expanded bead obtained in Example 1 using TEM at a magnification of 20,000.

FIG. 3 is an electron micrograph obtained by photographing a cross-section of a part near a surface of the pre-expanded bead obtained in Example 1 using TEM at a magnification of 100,000.

FIG. 4 is an electron micrograph obtained by photographing a cross-section of a central part of the pre-expanded bead obtained in Example 1 using TEM at a magnification of 20,000.

FIG. 5 is an electron micrograph obtained by subjecting the pre-expanded bead obtained in Example 1 to an extraction treatment of polystyrene-based resin, and photographing a surface of the pre-expanded bead after the treatment using SEM at a magnification of 1500.

FIG. 6 is an electron micrograph obtained by subjecting the pre-expanded bead obtained in Comparative Example 3 to an extraction treatment of polystyrene-based resin, and photographing a surface of the pre-expanded bead after the treatment using SEM at a magnification of 1500.

FIGS. 2 to 4 were imaged by the following manner:

That is, the pre-expanded bead obtained in Example 1 was divided into two. Then, a cross-section of the pre-expanded bead was entirely covered with a normal temperature curing-type epoxy resin (embedding resin), and thereafter stained with ruthenium tetraoxide (RuO$_4$).

Then, the pre-expanded bead was sliced into a thin film using an ultramicrotome to prepare a test piece. This test piece was imaged at using TEM a predetermined magnification.

In addition, in FIGS. 5 to 6, an extraction treatment of polystyrene-based resin was performed by the following manner:

The pre-expanded bead was immersed in 401 milliliters of tetrahydrofuran, and stirred at 23° C. for 3 hours to extract a polystyrene-based resin from the pre-expanded bead.

Then, the pre-expanded bead after the extraction is taken out from tetrahydrofuran, and tetrahydrofuran attached to or permeated in a surface of the pre-expanded bead was removed by air drying, to obtain the pre-expanded bead with a polystyrene-based resin extracted off.

As shown in FIG. 2 and FIG. 3, at a part near a surface of the pre-expanded bead, the polyolefin-based resin 1 is contained at a high ratio, while the polystyrene-based resin 2 is gradually reduced in an amount and a size as approaching to a surface of a bead. Then, a surface of the pre-expanded bead is generally formed of the polyolefin-based resin 1.

In addition, as shown in FIG. 4, at a central part of the pre-expanded bead, the polystyrene-based resin 2 is contained at a high ratio, and the polyolefin-based resin 1 is dispersed in a layer-like in the polystyrene-based resin 2.

Further, FIG. 1 and FIG. 5 show bead surfaces before and after the extraction of a polystyrene-based resin from the pre-expanded bead of Example 1. On the other hand, FIG. 6 shows a bead surface after the extraction of the polystyrene-based resin from the pre-expanded bead of Comparative Example 3.

From FIG. 1 and FIG. 5, it is seen that gaps after the extraction of the polystyrene-based resin are only slightly formed on a surface of the pre-expanded bead of Example 1, while from FIG. 6, it is seen that innumerable gaps after the polystyrene-based resin extraction are formed on a surface of the pre-expanded bead of Comparative Example 3.

At a part near a surface of the pre-expanded bead of the present invention, a polyolefin-based resin is contained at a high ratio. On the other hand, as approaching a bead surface, a ratio of a polystyrene-based resin is reduced. In addition, a ratio of a polystyrene-based resin is gradually increased towards an inner part of a bead, and a polystyrene-based resin is contained in a central part at a high ratio. Further, a polystyrene-based resin is slightly dispersed in a polyolefin-based resin at a part near a surface.

Therefore, the pre-expanded bead of the present invention has excellent expansion moldability due to a central part containing the polystyrene-based resin at a high ratio. As a result, an expanded molded article having a desired shape can be easily prepared.

In addition, a part near a surface of the pre-expanded bead is in the state where a polyolefin-based resin is dominant. Therefore, when the pre-expanded beads are charged into a mold, and is secondarily expanded, beads are mutually thermally fused and incorporated better, whereby, an expanded molded article having excellent strength and appearance can be obtained.

In addition, since the resulting expanded molded particle is in the state where a surface thereof is generally covered with a polyolefin-based resin, the article has excellent chemical resistance and impact resistance. On the other hand, the interior of an expanded bead constituting the expanded molded article is in the state where a polystyrene-based resin is contained at a high ratio, the article also has excellent stiffness.

In addition, when a "z" average molecular weight of a polystyrene-based resin as measured by GPC is 350,000 to 1,100,000, secondary expandable property of the pre-expanded bead can be improved. In addition, an expanded molded article having excellent strength can be obtained.

Further, according to the method of producing the pre-expanded bead of the present invention, the pre-expanded bead having excellent properties as described above can be easily produced without using a special apparatus.

In addition, by adding a predetermined amount of a polymerization initiator by a predetermined time in the aforementioned method of producing a pre-expanded bead, a ratio of a polyolefin-based resin at a part near a surface of a pre-expanded bead can be increased. As a result, an expanded molded article having excellent strength can be obtained from the pre-expanded beads.

Further, by polymerizing a styrene-based monomer containing a predetermined amount of a polymerization initiator in an aqueous medium and, then, polymerizing a styrene-based monomer containing no polymerization initiator in an aqueous medium, a ratio of a polyolefin-based resin at a part near a surface of the pre-expanded bead can be assuredly increased. As a result, an expanded molded article having further excellent strength can be obtained from the pre-expanded beads.

The expanded molded article of the present invention is useful in a core material for a vehicle bumper, a vehicle cushioning material such as a door interior cushioning material, and a container for conveying foods, an electric part and various industrial materials etc.

Figure 1:
FIG. 1 is an electron micrograph obtained by photographing a surface of the olefin-modified polystyrene-based resin pre-expanded bead obtained in Example 1 using SEM.
Figure 2:
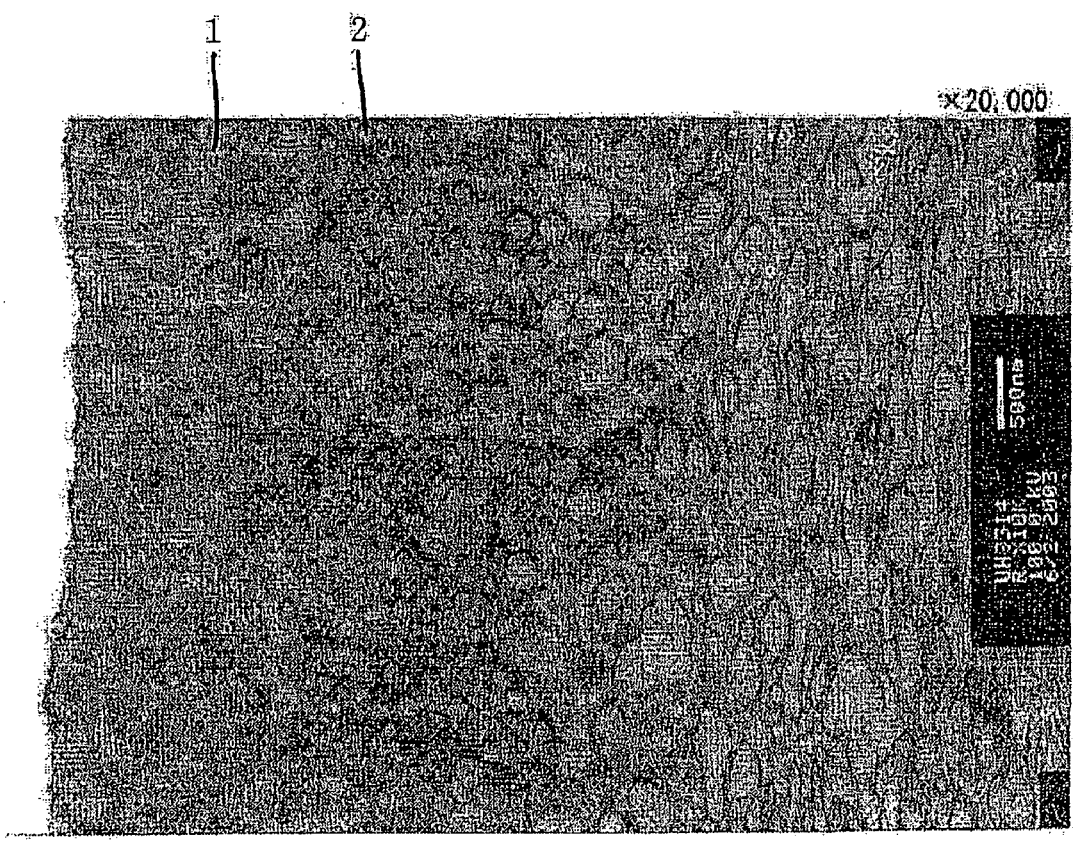
FIG. 2 is an electron micrograph obtained by photographing a cross-section of a part near a surface of the olefin-modified polystyrene-based resin pre-expanded bead obtained in Example 1 using TEM.
Figure 3:
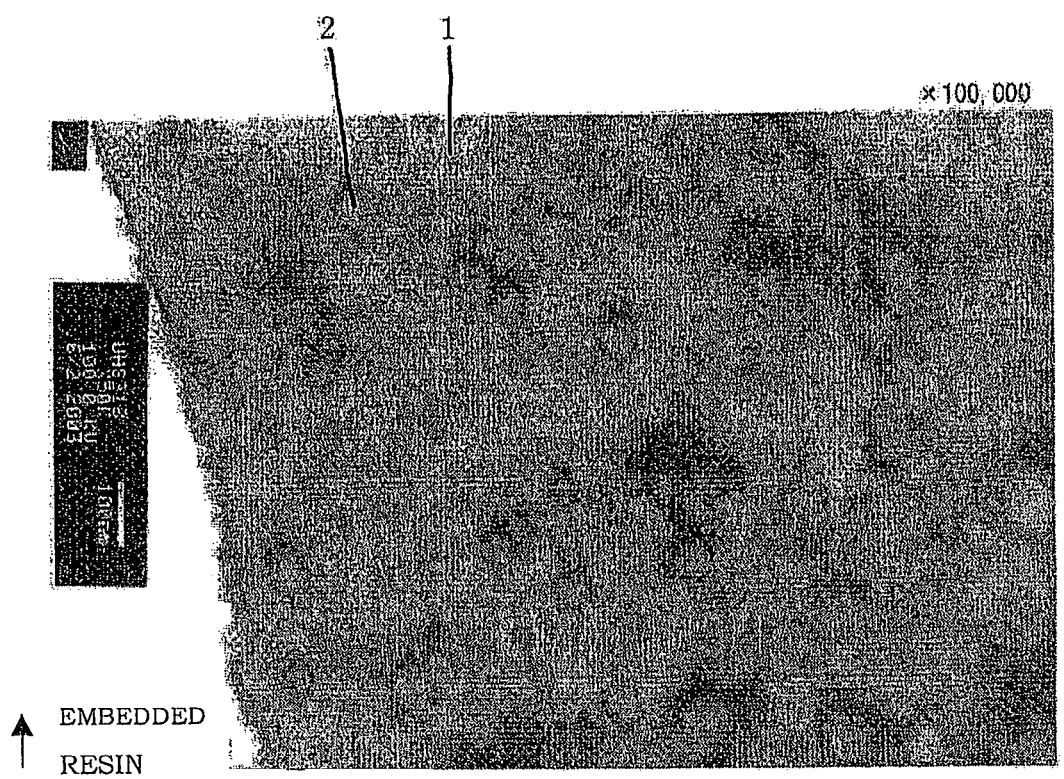
FIG. 3 is an electron micrograph obtained by photographing a cross-section of a part near a surface of the olefin-modified polystyrene-based resin pre-expanded bead obtained in Example 1 using TEM.
Figure 4:
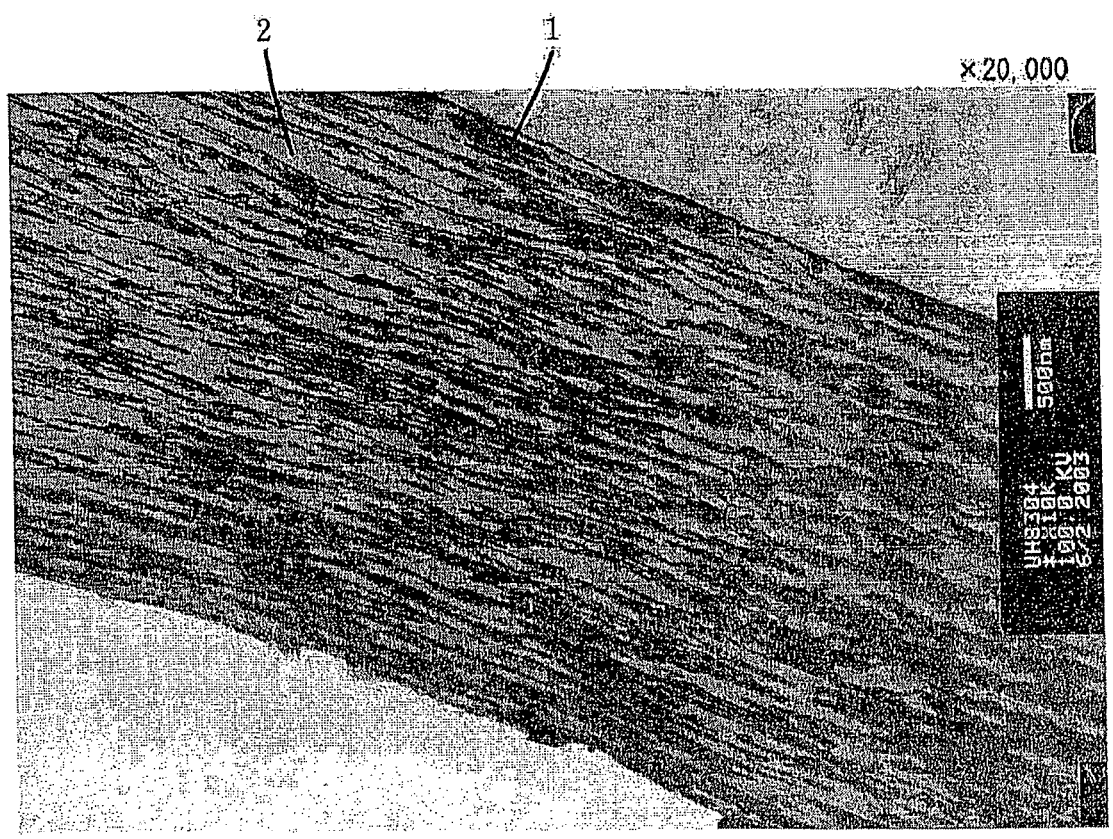
FIG. 4 is an electron micrograph obtained by photographing a cross-section of a central part of the olefin-modified polystyrene-based resin pre-expanded bead obtained in Example 1 using TEM.
Figure 5:
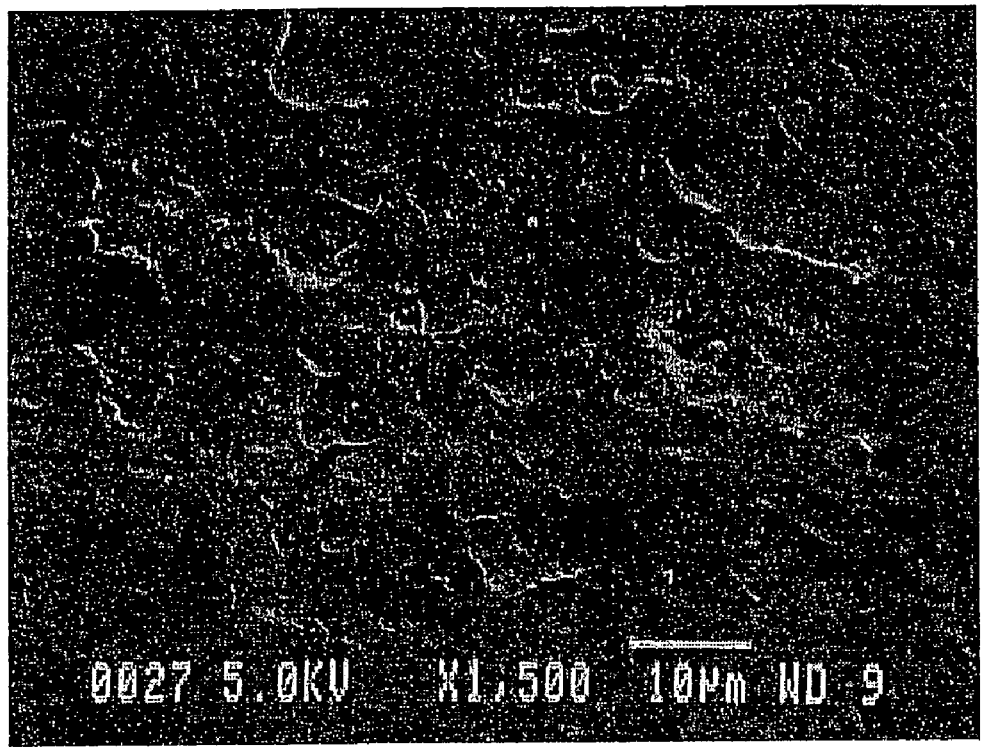
FIG. 5 is an electron micrograph obtained by photographing a surface of the olefin-modified polystyrene-based resin pre-expanded bead after an extraction treatment of polystyrene-based resin using SEM (Example 1).
Figure 6:
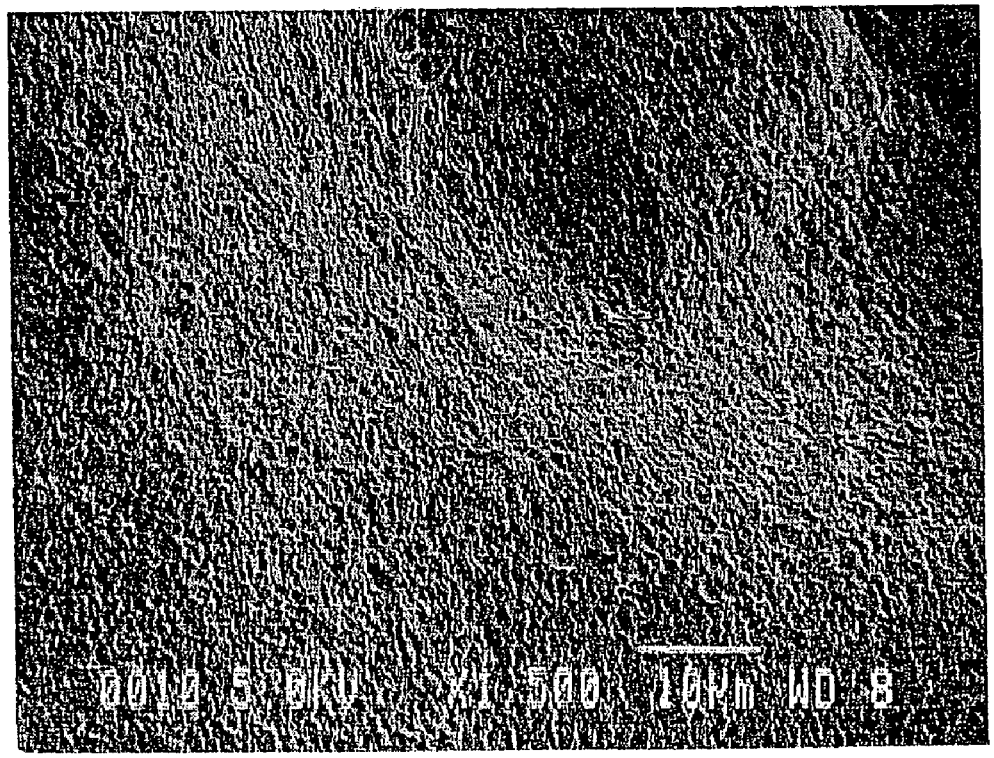
FIG. 6 is an electron micrograph obtained by photographing a surface of the olefin-modified polystyrene-based resin pre-expanded bead after an extraction treatment of polystyrene-based resin using SEM (Comparative Example 3).
Figure 7:
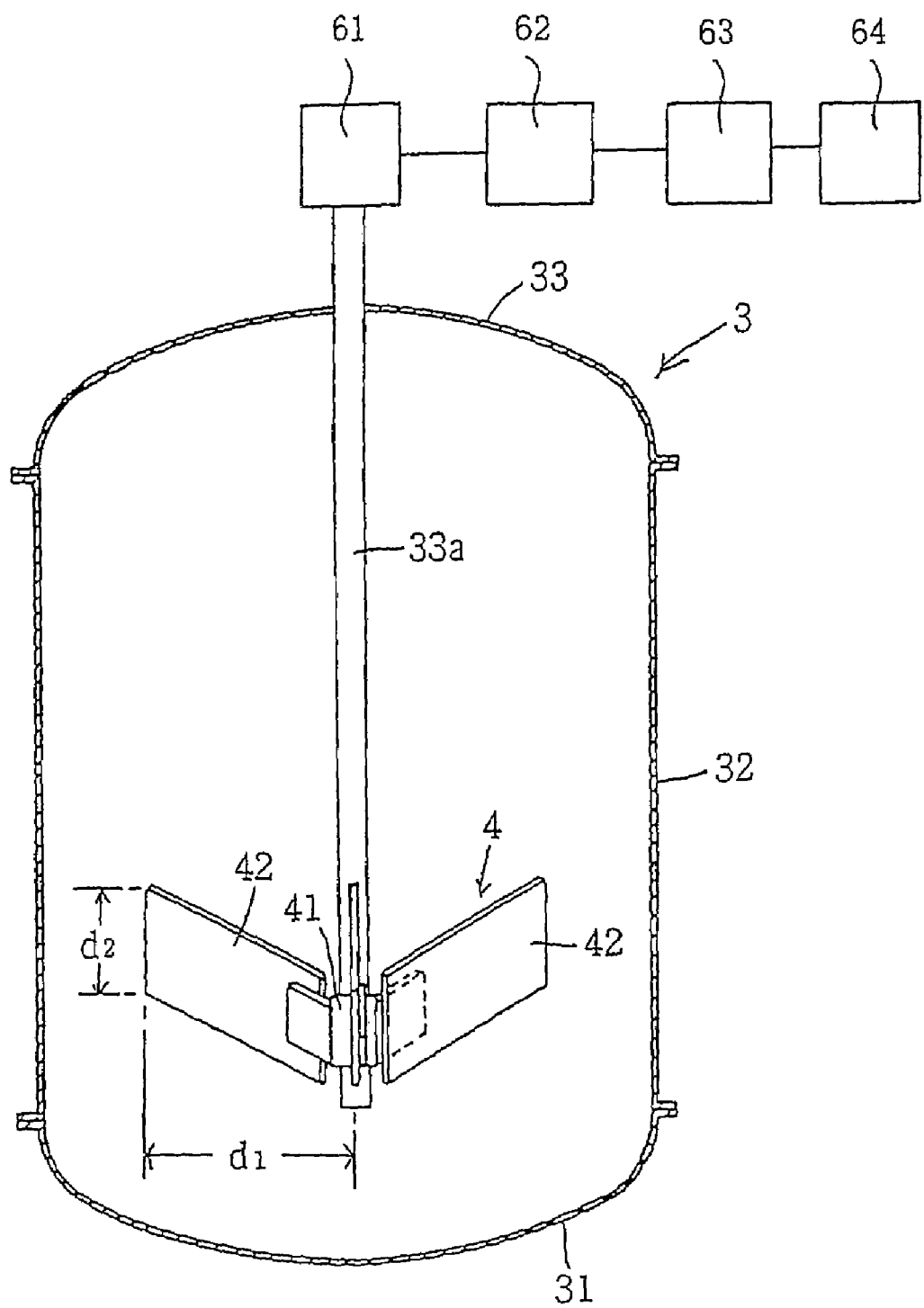
FIG. 7 is a schematic cross-section of a polymerization vessel used in Example 1.
Figure 8:
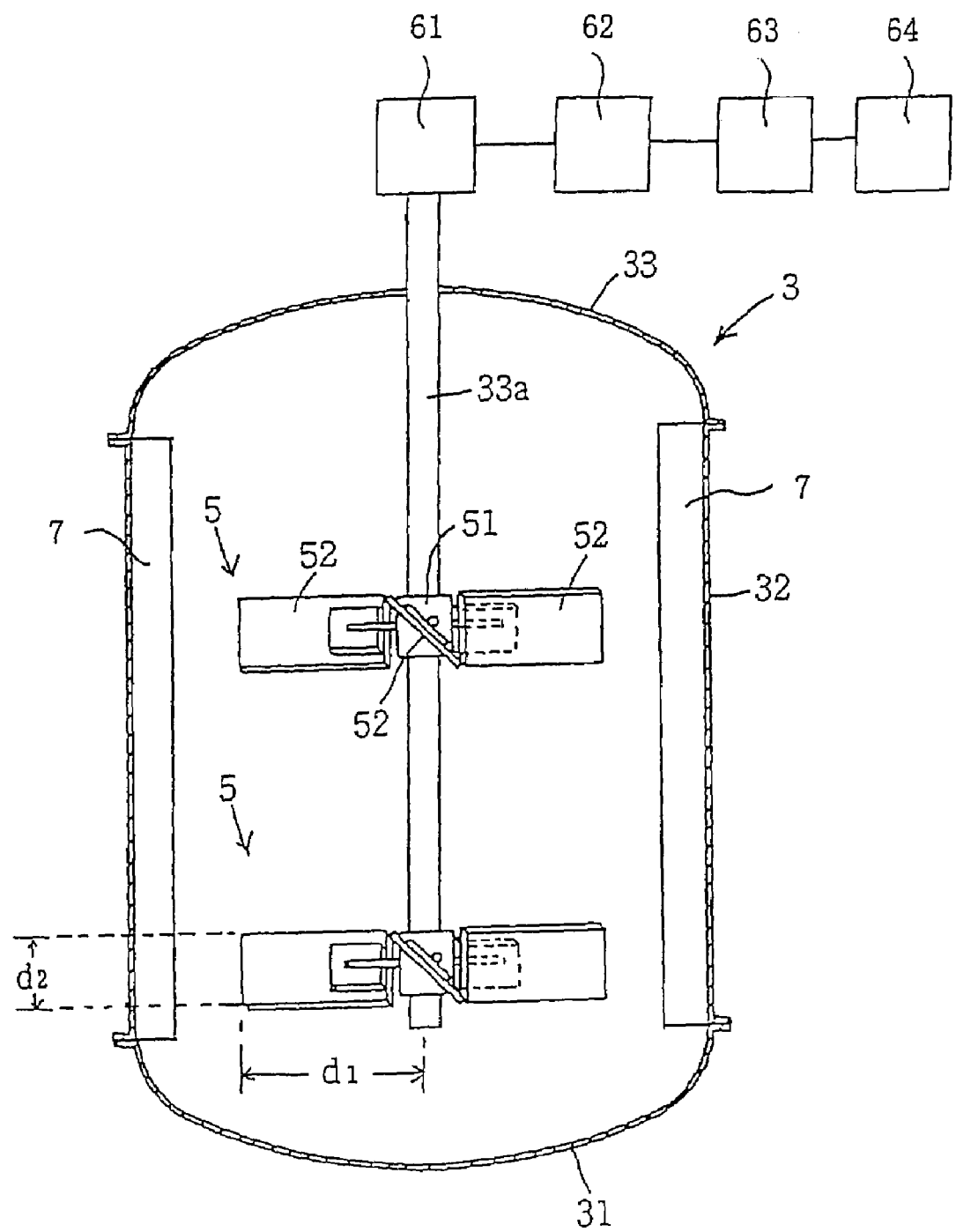
FIG. 8 is a schematic cross-section of a polymerization vessel used in Example 10.
Figure 9:
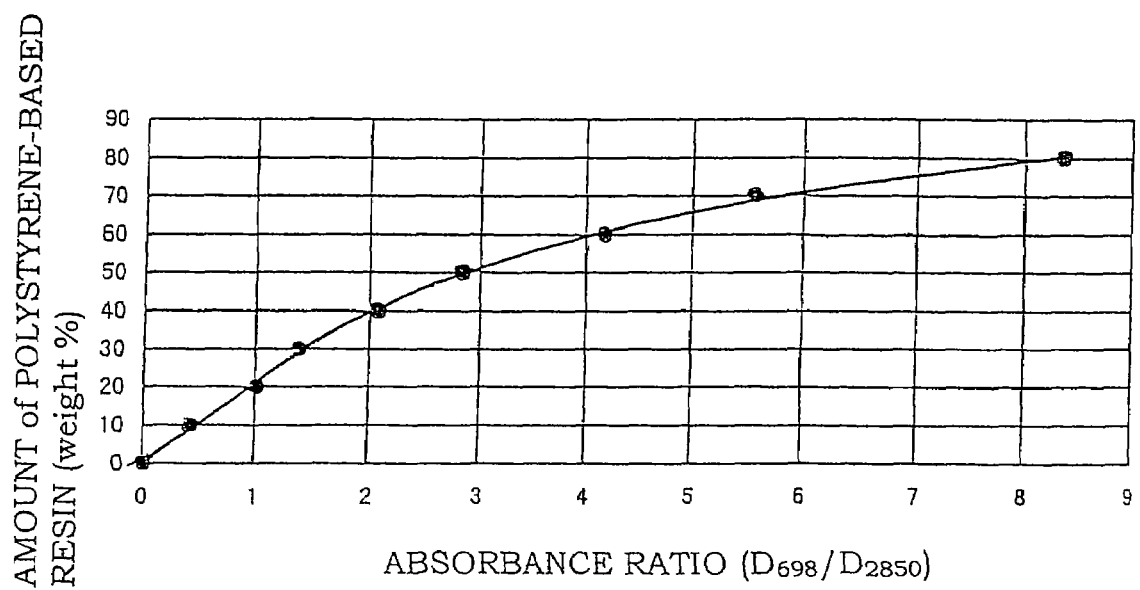
FIG. 9 is a calibration curve showing a relationship between a polystyrene-based resin amount and an absorbance ratio.

What is claimed is:

1. Pre-expanded beads of styrene-modified polyolefin-based resin comprising pre-expanded beads of a polyolefin-based resin modified with a polystyrene-based resin, wherein a styrene-based monomer forming a polystyrene-based resin in the beads is used in the range of 120 to 1,000 parts by weight relative to 100 parts by weight of a polyolefin-based resin, a bulk density of each bead is 0.012 to 0.20 g/cm$^3$, and an absorbance ratio at 698 cm$^{-1}$ and 2850 cm$^{-1}$ ($D_{698}/D_{2850}$) obtained from an infrared absorption spectrum of each bead surface measured by ATR method infrared spectroscopy is in the range of 0.1 to 2.5.

2. Pre-expanded beads of olefin-modified polystyrene-based resin according to claim 1, wherein the absorbance ratio is in the range of 0.4 to 2.0.

3. Pre-expanded beads of olefin-modified polystyrene-based resin according to claim 1, wherein the bulk density is 0.0 14 to 0.15 g/cm$^3$.

4. Pre-expanded beads of olefin-modified polystyrene-based resin according to claim 1, wherein the polyolefin-based resin exists in a surface of the pre-expanded bead more than its central part.

5. Pre-expanded beads of olefin-modified polystyrene-based resin according to claim 1, wherein a "z" average molecular weight of the polystyrene-based resin measured with GPC is in the range of 350,000 to 1,100,000.

6. Pre-expanded beads of olefin-modified polystyrene-based resin according to claim 1, wherein the polyolefin-based resin is a branched low-density polyethylene, linear low-density polyethylene or ethylene-vinyl acetate copolymer, and the polystyrene-based resin is a polystyrene resin.

7. A method for producing pre-expanded beads of styrene-modified polyolefin-based resin comprising the steps of:
  (a) polymerizing a styrene-based monomer (120 to 1,000 parts by weight relative to 100 parts by weight of polyolefin-based resin beads to be used) while impregnating polyolefin-based resin beads with the styrene-based monomer, in the presence of a polymerization initiator in an aqueous medium in which the polyolefin-based resin beads are dispersed, to obtain the styrene-modified polyolefin-based resin beads,
  (b) impregnating the resin beads with a blowing agent, and
  (c) pre-expanding the resin beads impregnated the blowing agent to obtain the pre-expanded beads of olefin-modified polystyrene-based resin,
  wherein in the step (a), the aqueous medium is stirred at a power required for stirring of 0.06 to 0.8 kw/m$^3$, and impregnation and polymerization of the styrene-based monomer are performed under a condition where a styrene-based monomer content in the polyolefin-based resin beads is 35% by weight or less;
  and wherein in the step (a), the polymerization initiator is added at 0.02 to 2.0% by weight of a total amount of the polyolefin-based resin beads to be used and the styrene-based monomer until an amount of the styrene-based monomer to be used reaches 40 to 90% by weight of the total amount of the styrene-based monomer to be used, and then a styrene-based monomer containing no polymerization initiator is added.

8. A method for producing pre-expanded beads of olefin-modified polystyrene-based resin according to claim 7, wherein, in the step (a), the polymerization initiator is added at 0.02 to 2.0% by weight of a total amount of the polyolefin-based resin beads to be used and the styrene-based monomer until an amount of the styrene-based monomer to be used reaches 90% by weight of a total amount of the styrene-based monomer to be used.

9. A method for producing pre-expanded beads of olefin-modified polystyrene-based resin according to claim 7, wherein, an amount of the styrene-based monomer containing no polymerization initiator is 10 to 60% by weight of a total amount of a styrene-based monomer to be used.

10. A method for producing pre-expanded beads of olefin-modified polystyrene-based resin according to claim 7, wherein a polymerization of the styrene-based monomer is conducted in the range of −30 to +10° C. of a melting point of the polyolefin-based resin.

11. A method for producing pre-expanded beads of olefin-modified polystyrene-based resin according to claim 7, wherein the polyolefin-based resin beads are beads of a branched low-density polyethylene, linear low-density polyethylene or ethylene-vinyl acetate copolymer, and the polystyrene-based monomer is a styrene monomer.

12. A method for producing pre-expanded beads of olefin-modified polystyrene-based resin according to claim 7, wherein the power required for stirring is in the range of 0.08 to 0.7 kw/m$^3$.

13. A method for producing pre-expanded beads of olefin-modified polystyrene-based resin according to claim 7, wherein the impregnation and polymerization of a styrene-based monomer are performed so that a content of the styrene-based monomer in the polyolefin-based resin bead is in the range 0 to 30% by weight.

14. A method for producing pre-expanded beads of olefin-modified polystyrene-based resin according to claim 7, wherein the step (b) is performed under stirring with a paddle-type stirring wing.

15. A method for producing pre-expanded beads of olefin-modified polystyrene-based resin according to claim 7, wherein a total amount of the styrene-based monomer to be used is in the range of 130 to 700 parts by weight relative to 100 parts by weight of the polyolefin-based resin beads.

16. A method for producing pre-expanded beads of olefin-modified polystyrene-based resin according to claim 7, wherein the styrene-based monomer contains a crosslinking agent.

17. An expanded molded article obtained by charging the pre-expanded beads of olefin-modified polystyrene-based resin of claim 1 into a mold, followed by expansion molding.

18. A vehicle cushioning material comprising an expanded molded article according to claim 17.

* * * * *

UNITED STATES PATENT AND TRADEMARK OFFICE
CERTIFICATE OF CORRECTION

PATENT NO. : 7,683,101 B2  Page 1 of 2
APPLICATION NO. : 10/567084
DATED : March 23, 2010
INVENTOR(S) : Naokuni Inada et al.

It is certified that error appears in the above-identified patent and that said Letters Patent is hereby corrected as shown below:

At column 28, line 9 (claim 2, line 1) of the printed patent, change "olefin-modified polystyrene-based" to --styrene-modified polyolefin-based--.

At column 28, line 12 (claim 3, line 1) of the printed patent, change "olefin-modified polystyrene-based" to --styrene-modified polyolefin-based--.

At column 28, line 15 (claim 4, line 1) of the printed patent, change "olefin-modified polystyrene-based" to --styrene-modified polyolefin-based--.

At column 28, line 19 (claim 5, line 1) of the printed patent, change "olefin-modified polystyrene-based" to --styrene-modified polyolefin-based--.

At column 28, line 23 (claim 6, line 1) of the printed patent, change "olefin-modified polystyrene-based" to --styrene-modified polyolefin-based--.

At column 28, line 57 (claim 8, line 1) of the printed patent, change "olefin-modified polystyrene-based" to --styrene-modified polyolefin-based--.

At column 28, line 65 (claim 9, line 1) of the printed patent, change "olefin-modified polystyrene-based" to --styrene-modified polyolefin-based--.

At column 29, line 3 (claim 10, line 1) of the printed patent, change "olefin-modified polystyrene-based" to --styrene-modified polyolefin-based--.

At column 29, line 8 (claim 11, line 1) of the printed patent, change "olefin-modified polystyrene-based" to --styrene-modified polyolefin-based--.

At column 29, line 14 (claim 12, line 1) of the printed patent, change "olefin-modified polystyrene-based" to --styrene-modified polyolefin-based--.

At column 29, line 18 (claim 13, line 1) of the printed patent, change "olefin-modified polystyrene-based" to --styrene-modified polyolefin-based--.

Signed and Sealed this

Third Day of August, 2010

David J. Kappos
*Director of the United States Patent and Trademark Office*

At column 30, line 3 (claim 14, line 1) of the printed patent, change "olefin-modified polystyrene-based" to --styrene-modified polyolefin-based--.

At column 30, line 7 (claim 15, line 1) of the printed patent, change "olefin-modified polystyrene-based" to --styrene-modified polyolefin-based--.

At column 30, line 12 (claim 16, line 1) of the printed patent, change "olefin-modified polystyrene-based" to --styrene-modified polyolefin-based--.

At column 30, line 16 (claim 17, line 2) of the printed patent, change "olefin-modified polystyrene-based" to --styrene-modified polyolefin-based--.